(12) United States Patent
Schmitz et al.

(10) Patent No.: US 11,429,507 B2
(45) Date of Patent: Aug. 30, 2022

(54) PERFORMANCE BENCHMARKING FOR REAL-TIME SOFTWARE AND HARDWARE

(71) Applicant: General Electric Company, Schenectady, NY (US)

(72) Inventors: Andrea M. Schmitz, Niskayuna, NY (US); Andrew W. Berner, Waterford, NY (US); Matthew B. Pfenninger, Cincinnati, OH (US); Jeffrey S. Gilton, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/898,351

(22) Filed: Jun. 10, 2020

(65) Prior Publication Data

US 2021/0390028 A1 Dec. 16, 2021

(51) Int. Cl.
*G06F 9/44* (2018.01)
*G06F 11/34* (2006.01)
*G06F 7/544* (2006.01)
*G06F 11/36* (2006.01)

(52) U.S. Cl.
CPC ........ *G06F 11/3428* (2013.01); *G06F 7/5443* (2013.01); *G06F 11/3457* (2013.01); *G06F 11/3612* (2013.01); *G06F 11/3688* (2013.01); *G06F 11/3692* (2013.01)

(58) Field of Classification Search
CPC .............. G06F 11/3428; G06F 7/5443; G06F 11/3457; G06F 11/3612; G06F 11/3688; G06F 11/3692
See application file for complete search history.

(56) References Cited

U.S. PATENT DOCUMENTS

| | | | |
|---|---|---|---|
| 5,446,874 A | 8/1995 | Waclawsky et al. | |
| 6,301,652 B1 * | 10/2001 | Prosser | G06F 8/4442 |
| | | | 712/204 |
| 67,546,122 | 6/2004 | Vanfladern et al. | |

(Continued)

FOREIGN PATENT DOCUMENTS

| | | |
|---|---|---|
| EP | 1331565 A1 | 7/2003 |
| EP | 2565788 | 3/2013 |

*Primary Examiner* — Hang Pan
(74) *Attorney, Agent, or Firm* — Fitch, Even, Tabin & Flannery LLP

(57) ABSTRACT

A system and method determines a unique performance benchmark for specific computer object code for a particular microprocessor. By generating multiple unique benchmarks for a single, same code module on multiple different processors, the method determines which processor is optimal for the code module. By generating for a single designated processor a performance benchmark for each code modules of multiple modules, where the multiple modules have a same/similar functionality but variations in detailed code or algorithms, the system and method identifies code variation(s) which is/are optimal for the single designated processor. The system and method may entail first extracting selected features of object code (as actually executed) into a code profile, and then generating the performance benchmark based on the code profile and in machine-level timing data for the selected microprocessor. In this way, code security is achieved by fire-walling the object code from the second stage of the method.

17 Claims, 6 Drawing Sheets

Exemplary Method for Determining Microprocessor Timing Data

(56) References Cited

U.S. PATENT DOCUMENTS

| | | |
|---|---|---|
| 8,566,803 B2 | 10/2013 | Branson et al. |
| 9,009,676 B2 | 4/2015 | Chua et al. |
| 9,740,595 B2 | 8/2017 | Enright et al. |
| 10,067,848 B2 | 9/2018 | Dunn et al. |
| 10,498,616 B1 | 12/2019 | Delaney et al. |
| 2005/0120341 A1 | 6/2005 | Blumental et al. |
| 2006/0074970 A1* | 4/2006 | Narayanan .......... G06F 11/3476 707/999.102 |
| 2007/0021882 A1* | 1/2007 | Hartrey ............... G06F 11/0751 701/33.4 |
| 2008/0127120 A1* | 5/2008 | Kosche ............... G06F 11/3447 717/131 |
| 2009/0083717 A1* | 3/2009 | Branson ............. G06F 11/3428 717/130 |
| 2011/0113224 A1* | 5/2011 | Isshiki ................ G06F 11/3466 712/240 |
| 2013/0311651 A1* | 11/2013 | Olsson ................. G06F 11/302 709/224 |

* cited by examiner

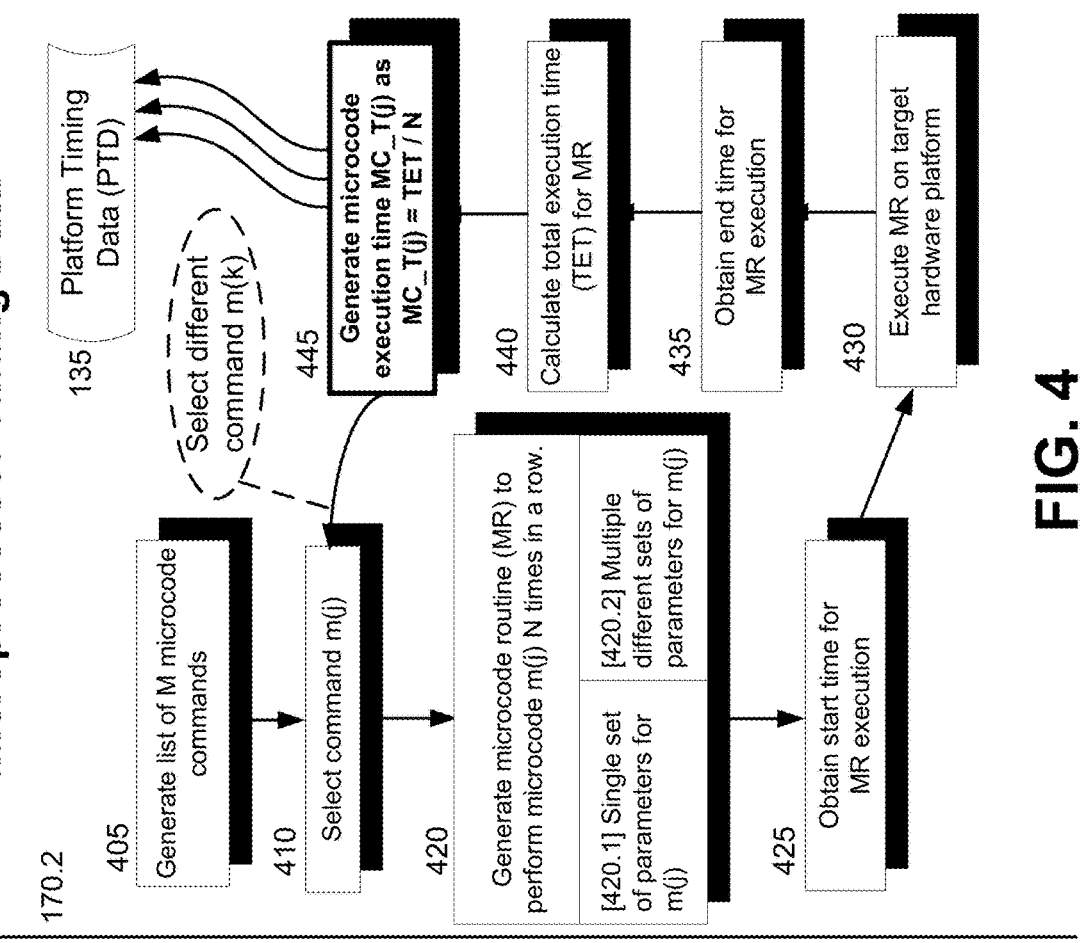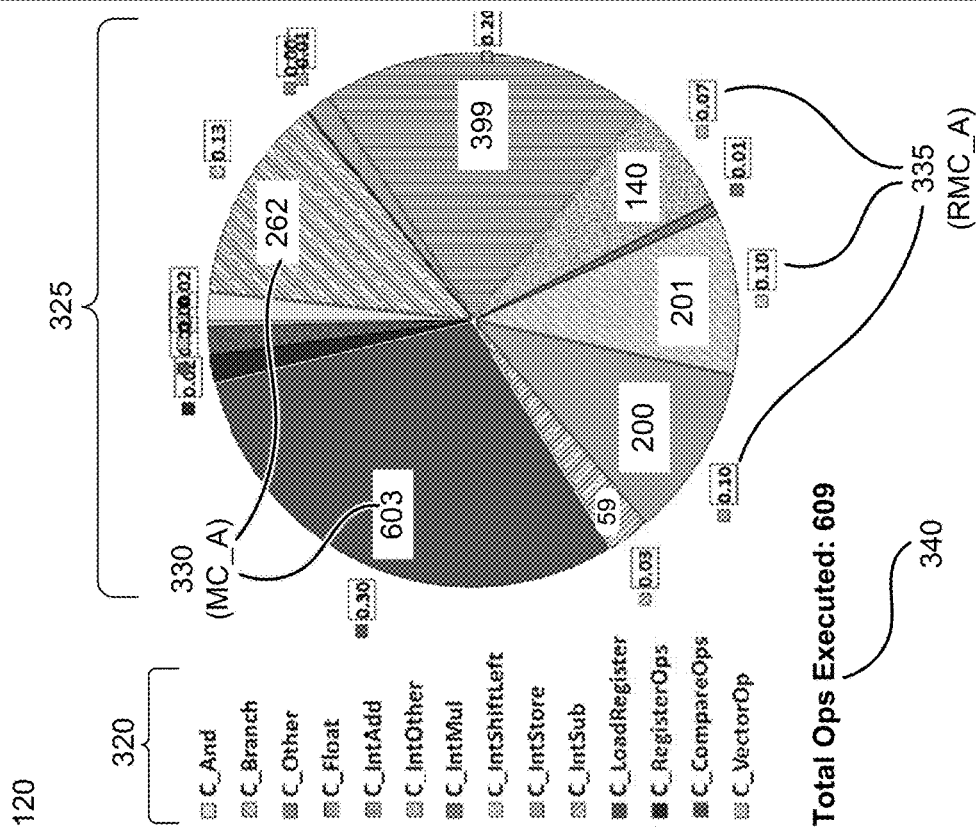

Exemplary Performance Benchmark Calculation 170.3 Generate Benchmark $$(PB1)\ Benchmark[s,h] = \sum_{k=1}^{CS} MC\_Timing_k \times MC\_Appearances_k$$

$$(PB2)\ Benchmark[s,h] = \sum_{k=1}^{CS} MC\_Timing_k \times RMC\_Appearances_k$$

$$(PB3)\ Benchmark[s,h] = \sum_{k=1}^{CS} WeightingFactor_k \times MC\_Timing_k \times MC\_Appearances_k$$

CS = total number of distinct machine level commands (MC) on the target module 115, or the total number of distinct machine level commands detected as executed by the target module $MC\_T_k$ = the timing (absolute or clock cycles) for the $k^{th}$ machine-level command (MC) when the command is executed a single time on hardware platform (h)

$MC\_A_k$ = the number of times the $k^{th}$ MC is executed by the hardware platform when running the target module (s) on hardware platform (h)

$RMC\_A_k$ = the relative number (fractional value) of times the $k^{th}$ MC is executed by the hardware platform when running the target module (s) on hardware platform (h)

$WF_k$ = Weighting factor for the $k^{th}$ MC

FIG. 5

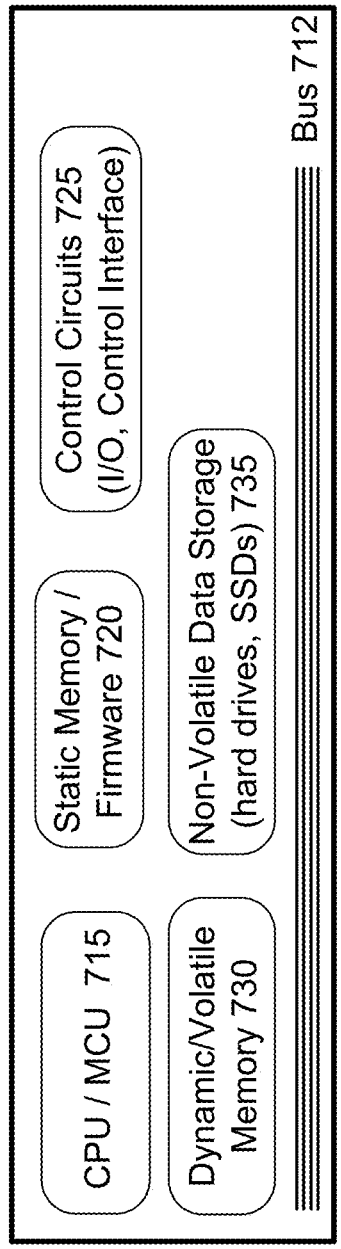
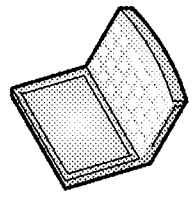
FIG. 7

PERFORMANCE BENCHMARKING FOR REAL-TIME SOFTWARE AND HARDWARE

TECHNICAL FIELD

The present invention relates to design-phase optimization of computational systems. More particularly, the present system and method pertains to generating performance benchmarks for custom computer software run on particular hardware systems. The present system and method also pertains to generating one or more performance benchmarks which are relevant for real-time, time-critical computational system performance.

BACKGROUND

Real-Time or Mission Critical Programming

The field of real-time computing (RTC) (also sometimes called "deterministic computing") pertains to hardware and software systems subject to one or more "real-time constraints", for example from event to system response. Real-time hardware and software programs must typically guarantee responses to system events within specified time constraints, which may be referred to as "deadlines."

Systems used for many mission critical applications must be real-time, such as for control of fly-by-wire aircraft, or anti-lock brakes, both of which demand immediate and accurate mechanical and electrical response. More generally, in aviation systems or in transport systems of other types, engines and control systems may be required to respond to critical environmental events within a specified time in order to sustain safe operations of an airplane or other vehicle. Other systems which entail no mechanical components may also be mission-critical. For example, in order to maintain uninterrupted and/or high-quality communications of mission-critical data, a communications system may require mission-critical packet routing, switching, data compression/decompression, data encryption/decryption, etc.

In typical systems, time-critical responses reflect automated operations (that is, without real-time intervention of a human operator), and the deadlines for system responses to events may be on the order of milliseconds or microseconds. A system not specified as operating in real time cannot usually guarantee a response within any timeframe, although typical or expected response times may be given. Real-time processing fails if not completed within a specified deadline relative to an event; deadlines must always be met, regardless of system load, for optimal or even for safe system performance.

A real-time system can also be characterized as one which receives environmental or system data (typically from system or environmental sensors), processes the sensed data, and returns result(s) with sufficient response to affect the system operations and/or the environment at substantially the same time as the data was received, that is, without significant delay.

Software for real-time applications typically needs to be carefully coded and finely tuned for optimum performance on a specific, designated hardware microprocessor. Real-time software applications may include either or both of application-specific software and real-time operating systems.

Software Benchmarks

Software benchmarks are numeric values, determined through testing of software (either code in development or commercially released software) which indicate the performance speed of software. When a particular program or software module has a higher numeric score than other, functionally similar software modules, the high numeric rating typically indicates a faster performance speed. In the alternative, benchmarks may also be configured so that lower numbers indicate reduced performance time for tasks, and therefore better performance.

Many benchmarks exist today which measure the performance of hardware as opposed to software, typically measuring the performance of hardware microprocessors. Some well-known benchmarks include Dhrystone, whetstone, and several developed by the Embedded Microprocessor Benchmark Consortium. Typically, however, these are all generalized benchmarks principally designed to determine the performance of the underlying hardware such as microprocessors (possibly along with related hardware such as data buses). They are principally meant to characterize the relative general performance of different microprocessors, irrespective of the particular application software which is run on a given microprocessor.

The existing generalized benchmarks suffer from the similar deficiencies, which can pertain both to real-time programming and to programming for less mission-critical applications (such as general purpose business software.) The existing benchmarks measure what they are designed to measure (for example, integer performance or floating point performance, or some combination of both) on a selected hardware processor. For particular software applications running in specialized environments—and in particular for real-time systems—it is difficult to estimate or compare processing performance for a particular system and application via these generalized benchmarks. This is because particular real-time environments and real-time software applications have unique and distinctive requirements for integer commands, floating point commands, and other low-level memory commands.

What is needed then is a system and method to profile an existing application (often an in-development alpha or beta application for a real-time system), as the application is running in a representative hardware environment. What is further needed are custom benchmarks that will better estimate real-time performance of specific, in-development software for a particular target hardware system.

SUMMARY OF THE INVENTION

In at least one aspect, embodiments of the present system and method determine a unique performance benchmark for specific computer object code, as that code is actually running on a particular, designated hardware microprocessor.

Single Code Module Benchmarked on Multiple Processors: In an embodiment, the system and method may generate multiple unique benchmarks for a single, same object code module for each one of multiple processors, so that the system and method may determine which hardware processor (among the multiple potential processors or "target platforms") is optimal for the code module.

Functionally Similar Software Modules: In another embodiment, the system and method may generate, for a single designated processor, multiple performance benchmarks, with a unique benchmark for each code module of multiple target software modules, with a goal of selecting just one of the target software modules for actual use and deployment. Each of the multiple software modules may have a same or similar functionality but have variations in detailed code or algorithms. In this way the system and method may identify those code variation(s) which is/are optimal for a particular designated target platform (for example, a particular designated hardware processor).

Functionally Different Software Modules: In another embodiment of the present system and method, multiple different target software modules have different functionalities, and the multiple modules are intended for combined (that is integrated) performance, possibly operating in parallel or in sequence, or both. Each target module may then have a very different code set. The present system and method may generate a first set of performance benchmarks for each target module when run on a first processor or first target hardware platform, then generate a second set of benchmarks for each target module when run on a second (different) target processor or different target hardware platform, etc. In this way, and guided by performance benchmark results for multiple different co-operative target modules, design engineers may select a target hardware processor which provides a desired balance of adequate performance times for most or all of the target software modules (and so provides optimum performance for the integrated software system of all the target modules).

Methods: In some embodiments, the system and method may entail a first stage for extracting selected features of object code into a code profile, and a second stage to generate the performance benchmark, based on the code profile and based on a choice of a particular designated test hardware processor. In this way, code security is achieved by fire-walling the object code from the second stage of the method. In an embodiment, the code profile reflects the distribution of microcode commands which are executed by the object code when run on a selected target processor under specific conditions.

In an embodiment, the system and method may also entail a second stage of generating a processor profile for a specific processor, and a second stage of jointly analyzing the code profile and the processor profile to generate the performance benchmark. In such an embodiment, the processor-specific performance benchmark for a particular object module may be generated either (i) without a requirement to actually run the object code on the specific processor (running the code instead on a different processor), or, in some embodiments, (ii) without a requirement to run the object code on any processor.

In some embodiments, the system and method is directed not only towards profiling the object code, but further towards identifying and isolating, for analysis, mainly those portions of the object code that are most typically or most frequently called into use as the target software module is actually being run on a processor in real-time.

In an embodiment, the system and method may also be used to generate a performance benchmark for a designated computer program or code module when the code module is run on a specific virtual processor or through an interpreter (such as for example Java).

Embodiments of the present system and method may be particularly applicable to benchmarking object code designated for use in real-time, performance critical applications. However, the present system and method may also offer advantages for benchmarking software performance for non-mission critical systems.

In some embodiments, the present system and method may entail the use of either a local or distributed computer profiling system, where the profiling system executes a method for benchmarking computer code, the method comprising:

(i) deconstructing a first object code for a first software module to create a first profile of machine-language instructions of the first object code for the first software module, which may be indicative of the machine-language instructions executed when the first object code module is run on a given target processor or target hardware system;

(ii) benchmarking a first target hardware system which comprises a first set of hardware to determine a real-time execution timing data machine-language instructions of the first target hardware system;

(iii) combining the first profile of the first software module with the timing data of the first target hardware system to generate a first performance benchmark, where the first performance benchmark is reflective of both the first object code of the first software module and the architecture of the first target hardware system.

In some embodiments, the deconstruction stage (stage (i)) may entail running the software modules on a processor which has an instruction set that is shared by other processors (for example, different processors in a manufacturers line of related processors, or different processors with a common hardware architecture, such as the well-known Intel instruction sets). In alternative embodiments, the deconstruction stage (stage (i)) may entail analyzing the object code to determine a distribution of machine-level commands, without actually running the object code on any processor.

In some embodiments of the present system and method, the stages or steps of generating the benchmark for a particular code module and a particular hardware processor may be performed by a single computer, and with the stages performed substantially consecutively in time (that is, with each successive analysis stage beginning substantially upon the completion of an immediately prior analysis stage). In alternative embodiments, stages of the analysis may be performed by separate computers of a distributed system, and may be performed with substantial time gaps (for example, minutes, hours, days or longer periods) between the analysis stages.

BRIEF DESCRIPTION OF THE DRAWINGS

Advantageous designs of embodiment of the present invention result from independent and dependent claims, the description, and the drawing. In the following, preferred examples of embodiments of the invention are explained in detail with the aid of the attached drawings:

FIG. 3 illustrates an exemplary instruction mix breakdown which may be generated by a run-time analysis of a target software module when executed on an exemplary target hardware platform or simulation of the platform.

FIG. 4 illustrates an exemplary process for determining a length of time required to execute a particular microcode instruction on a target hardware platform.

FIG. 5 illustrates several alternative, exemplary performance benchmark calculations according to the present system and method.

FIG. 7 presents a block diagram of an exemplary computer for benchmarking software and hardware according to the present system and method.

DETAILED DESCRIPTION OF EXEMPLARY EMBODIMENTS

Figure 1:
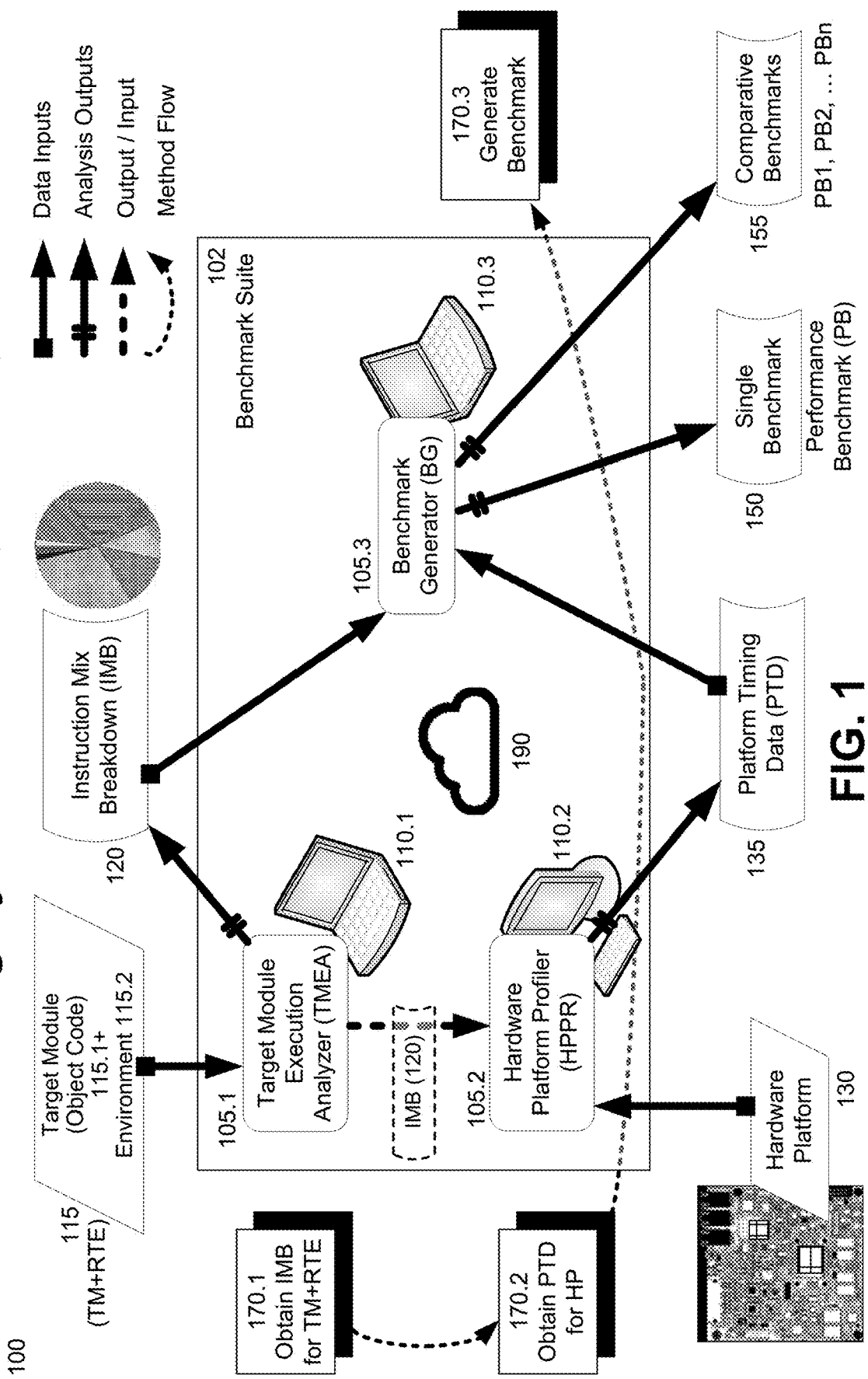
FIG. 1 is an integrated system-element/method diagram which illustrates some exemplary system elements and also some exemplary method steps for generating a performance benchmark for a target module intended to be executed on a target hardware platform.

The following detailed description is merely exemplary in nature and is not intended to limit the system and methods, nor the elements or steps of the system and method, nor its applications, and its uses disclosed herein. Further, there is no intention for the scope to be bound or limited to or by any theory presented in the preceding background or summary, nor in the following detailed description.

Throughout the application, description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skilled in the art that in some specific instances, an embodiment can alternatively be described using the language "consisting essentially of" or "consisting of."

I. Terminology

It will be understand in this document that:

Object code is computer code which contains machine-level commands (or in some embodiments, byte-code), also known as "microcode", "machine language instructions", "assembly language instructions", or in some instances for brevity, simply "instructions" or "commands". The object code containing machine-level commands is generated from source code which may be written in any of numerous commonly-used or specialized high level programming languages. Such languages include for example and without limitation: C, C++, C#, FORTRAN, Java, LISP, Perl, Python, Ruby and also synchronous programming languages such as Argos, Atom, LabVIEW, Lustre, PLEXIL, and many others. Object code is typically generated from high-level language code by an automatic process using an application program known as a "compiler" in a process called "compiling."

Machine-level code, microcode, or assembly code commands may also be understood as the native machine instructions for a given hardware microprocessor, which are determined by the fixed hardware design of the processor. In many cases, there are "families" of different-but-similar microprocessors which share a common set of native machine instructions (or at least share a common core set of native machine instructions, with advanced processors in a family possibly having additional native machine instructions lacking from simpler sibling processors).

Target application, target module, target software module, target object code, target code, target program: Object code to be analyzed and benchmarked by the present system and method may be referred to in this document, equivalently, by any of the preceding terms. Persons skilled in the art will appreciate that, in general usage in the art and in various contexts, some of the above terms may have similar, slightly different, but overlapping meanings. For example, a single application program may include object code contained in one or in multiple software modules or software libraries. For purposes of the appended claims, the term "object code module" is employed as an umbrella term for target executable programs, target applications, target software modules, for target libraries, etc. It will be understood that real-time system development typically entails the generation and evaluation of multiple target modules or target applications.

Target processor, target microprocessor, target real-time processor, target hardware processor, target microcontroller, target controller, selected processor, selected microprocessor: In this document, a hardware processor designed to process and execute the object code in a module may be referred to by any of the above terms. A target processor may typically be a hardware microprocessor with one or more cores, or may be a more special-purpose controller, capable of interpreting and executing target object code. In some embodiments of the present system and method the target processor may be a single large-scale integration microchip. In some embodiments, the target processor may be an LSI or VLSI chip on-board circuitry for memory access, data bus access, cache memory, or other processing purposes.

For purposes of the appended claims, the term "target hardware system" refers to and encompasses either or both of a "hardware processor" or a "target platform" discussed immediately below.

The target processor may be a specialized processor for real-time applications; to identify just one example (among many), the QorL® P2020 or P2010 communications processors made by NXP, Inc., and used in avionics, industrial control, gateway, smart home, and many other applications. In some embodiments, the target processor may instead be a general purpose processor, such as any of the numerous Pentium processors made by Intel Inc. or general purpose processors made by AMD, NXP, Qualcomm, Apple, TI, Renesas, Xilinx, etc.

As discussed further below, the present system method provides for, in part and among other elements, benchmarking one or more target modules for running with respect to one or more target processors, based in part on either or both of (i) actual, tested execution of the target module on the target processor, or (ii) expected and anticipated execution of the target module on the target processor.

Target platform, target hardware, target hardware system: In this document, the terms "target platform," "target hardware platform", "target system", and "target hardware system" are used synonymously for a processing system or computational system intended to be evaluated for benchmarking, where the processing/computational system typically includes a particular microprocessor and other supporting chips (such as memory chips, bus controllers, cache memory, I/O port chips, and other processing-related chips known in the art.) A target platform may also be regarded as including or encompassing a suitable operating system, which may be loaded or obtained from software or firmware.

Benchmarking: Both a generic term for rating a hardware processor and/or data processing system for performance; and more specifically within this document, generating a time/speed performance rating for a target module (which may be a software program, an object code module component of a larger software program, a library of a software program, or other object code compilation) reflecting the typical execution dynamics of the target module when run on a specified target processor or target computational system.

II. Overview of Performance Benchmarking Strategy and Tools

Benchmarking Suite (Benchmarking Application)

In an embodiment, the present system and method may employ a suite of tools 105 (software running on a suitable hardware processors or processors) to create a custom performance benchmark 150 that is tailored to a targeted application.

Benchmarking Software Tools: In some embodiments, the present system and method may employ the suite of software tools (software or firmware) running on a suitable computer or group of computers ("benchmarking computer system" 110) which may be networked together in real-time, or may not be networked together in real-time. That is, different software applications 105 of the suite may be run at separate times on separate benchmarking computers 110, with only a need to share (via a network 190 or via other forms of file transfer) various output files between different programs in the software suite.

In an alternative embodiment, all the required software tools 105.n may be integrated into a single benchmarking application program 105 run on a single computer 110. For convenience herein, exemplary software which may be employed to execute the present system and method may be referred to as the "benchmarking suite" 105.

Benchmarking Strategy

FIG. 1 presents an integrated system/data-flow/method diagram 100 which illustrates both some exemplary system elements 105, 110 and also exemplary method steps 170 for an exemplary system and method 100 to generate a performance benchmark 150 for a target software module 115. FIG. 1 also illustrates exemplary input sources 115, 120, 130, 135 and exemplary outputs 115, 120, 135, 150, 155. (Note that the IMB 120 and PTD 135, defined below, are both outputs and inputs.) The exemplary software elements of application tools 105 and one or more computers 110 may also be referred to herein as a "Benchmark Suite" 102. In some contexts, the term "benchmark suite" 102 may refer principally or exclusively to the application tools 110.

In one or more embodiments of the present system and method, a benchmarking strategy using the benchmarking suite 102 may include software tools 105.n for:

Data Collection for Real-Time Instruction Execution Mix: Collecting instruction execution trace data by running the target executable object code on real or simulated target hardware. As discussed further below, this may be done by a target module execution analyzer (TMEA) tool 105.1.

Object Code Breakdown for Target Module: Profiling the target object code to determine a representative low-level (that is, machine language or byte-code) instruction mix breakdown (IMB) 120 of the target executable object code. In an embodiment, the instruction mix breakdown 120 is based on those instructions typically employed when the target object code is actually being executed in a simulated or operational environment. The IMB 120 may identify, for example, a percentage of usage of different object code instructions during execution time, or may provide the raw number of times an object code instruction was executed. As discussed further below, this task may also be performed by the target module execution analyzer (TMEA) tool 105.1.

Timing Data for Target Hardware (Processor or Hardware Platform): Collecting timing data from a proposed target hardware, where the timing data indicates for multiple different instructions of the low-level instruction set the time for each instruction to run. The time may be in clock cycles, or in analog-mixed signal (AMS) timescales such as nanoseconds. As discussed further below, this may be done by a hardware platform profiler (HPPR) tool 105.2.

It will be noted that each low-level machine instruction will have its own distinct timing data; and further that such timing data will typically vary from one target microprocessor to another target microprocessor. For just one example, an instruction to retrieve a two-byte floating point number might require four cycles on a first hardware processor A while requiring six hardware cycles on a second hardware processor B.

Note that in some embodiments, timing data may be obtained for only a target microprocessor or microcontroller. In alternative embodiments, timing data may be obtained for a larger-scope hardware platform which may include a microprocessor/microcontroller, data buses, additional memory cache(s), I/O ports, designated bus speeds or volatile memory capacities/speeds, specific system firmware, and possibly a selected operating system or version/configuration of an operating system.

(iv) Benchmark Synthesis: From the timing data for a selected hardware processor/system, and from the instruction mix profile for the target object code, synthesizing an intermediate value representing the performance of the instruction mix for the target object code on the selected hardware processor. As discussed further below, this may be done by a benchmark generator tool (BG) 105.3.

(v) Benchmark comparison and analysis: For a given real-time hardware/software system in development (for example, for an airplane control system with real-time operational constraints), comparing the obtained performance benchmark score against a required score in the hardware specification for the real-time operational system. In this way, it may be determined if a particular target module or target application can be executed, on a test or potential hardware platform, to have a sufficiently fast response time for the control tasks at hand. As discussed further below, this may be also done by the benchmark generator tool (BG) 105.3.

Exemplary Features of a Performance Benchmark Created Using the Benchmarking Suite In exemplary embodiments of the present system and method, some features of an object code performance benchmark 150 created using the benchmarking suite may include, for example and without limitation:

(A) Environment-Dependent Benchmarking: Determining a performance benchmark 150 which takes into account such software and/or hardware features as cache utilization and cryptography (that is, encryption of the code in the object module); and may also take into account such physical environmental factors as system operating temperatures and/or CPU operating temperatures;

(B) Software-Specific Benchmarking: Accurate benchmark measurements of proprietary software with an obfuscated workflow;

(C) Common Timing Profile for Target Hardware: Once a potential target processor/platform is characterized for timing data, different software builds for the object module can be analyzed for throughput utilization based on a common timing profile for the potential target hardware;

(D) Realistic Profiling for Real-Time Execution: In embodiments of the present system and method, the Benchmarking Suite profiles the real-time instruction mix for the target object module, the timing profile favors (that is, provides a heavier weighting) for those machine-level instructions which are most frequently used in actual operation, while weighting less heavily those machine language instructions which are less frequently used in actual execution.

For example, a target object code module may include a one or more input-output (I/O) operations which are used relatively infrequently (for example, to obtain sensor data ten times per second), with those I/O operations being encapsulated in a code segment 'A'; multiple data analysis operations which are performed on current and historical sensor data, with the analysis operations encapsulated in a code segment 'B'; and system control (I/O) operations encapsulated in a code segment 'C'. Further suppose that in typical real-time operations (as determined by the present system and method), code segment 'A' is called into use 10% of the time, code segment 'B' 88% of the time, and code segment 'C' just 2% of the time, and then the object code profile will provide (for machine language instructions in code segments A, B, and C), relative frequencies of use in the ratios of 0.10/0.88/0.02, respectively.

If a particular machine language instruction 'T' is identified k times in code segment A, m times in code segment B, and n times in code segment C, then in profiling the target module the present system and method will weight or count instruction 'T' with a suitable weighting, for example, as $(0.10)*k+(0.88)*m+(0.02)*n$. Similar considerations would apply to other machine language instructions U, V, W, X, etc.

Note that the system of weighting and comparing instructions identified in the immediately preceding paragraphs is exemplary only, and other approaches to or formulas for weighting, profiling, or ranking absolute machine instruction set usage and relative usage of machine instructions—all consistent with usage identified by the Benchmark Suite during execution of the object code—may be employed consistent with the present system and method. For example, in some embodiments, performance benchmark 150s may be generated to differentiate between data/instruction fetch from RAM vs. the faster data/instruction fetch from cache memory.

The Benchmarking Suite provides a throughput assessment tool which is highly automated and can be integrated in any Continuous Improvement/Continuous Development (CI/CD) workflow.

III. Exemplary Elements and Data Flow for Benchmarking Code

Continuing with FIG. 1, the target software module(s) 115 may be a software program, an object module component of a larger software program, a library of a software program, or other object code compilation) intended to be executed on a target hardware platform 130. The performance benchmark 150 value(s) reflects the anticipated execution dynamics of the target module 115 by the target platform 130 or by a component of the target hardware platform, such as a target microprocessor 130.1 (see FIG. 2 below).

In FIG. 1, the solid black arrows indicate various sources/sinks and directions of exemplary data flows for some embodiments of the present system and method. The straight dotted black arrow illustrates optional data flow which may be employed in some embodiments of the present system and method. The curved dotted arrows indicate an exemplary flow of an exemplary method 170 according to the present system and method.

The exemplary system 105 may include one or more computers 110, such as desktop computers, servers, laptop or tablet computers, embedded test platforms or systems or similar, which may be configured to run the benchmarking tools 105 of the present system and method. FIG. 1 illustrates three exemplary computers (110.1, 110.2, and 110.3), but fewer or more computers 110 may be employed. Further, in the exemplary embodiment of FIG. 1, computers 110 are not networked together as part of for example a local area network (LAN) 190 or corporate network 190. In alternative embodiments, computers 110 may be connected via a local area network (LAN) 190 or via direct cable or wireless connections 190. In some embodiments, two or more of computers 110 may be data-coupled via a wide area network (WAN) 190 such as the internet 190. In general, it will be understood that data may be conveyed between computers 110, possibly in real-time or possibly with time delays, via either network connections 190 or tangible media (such as flash drives).

Running, or configured to run, on one or more of computers 110 are exemplary software tools of the benchmark suite 105. In the exemplary embodiment illustrated in FIG. 1, the software tools 105 include a target module execution analyzer (TMEA) tool 105.1, a hardware platform profiler (HPPR) tool 105.2, and a benchmark generator (BG) tool 105.3. Persons skilled in the art will recognize the exemplary tools illustrated in FIG. 1 may in some embodiments be combined into one or two software tools; and in alternative embodiments, one or more of the TMEA 105.1, HPPR 105.2, and/or the BG 105.3 may each be implemented as two or more separate software tools, with suitable data communications between them.

In an exemplary embodiment of the present system and method, a method 170 may entail a first step 170.1 of generating an instruction mix breakdown (IMB) 120 for a target module (that is, executable object code to be analyzed) 115.1 plus a run-time environment 115.2. (Herein below, the combination of target module 115.1, possibly with the run-time environment 115.2, may be referred to simply as the target module 115). The target module 115 may be provided to the TMEA 105 as input. Details of this are discussed further below (see FIG. 2).

Target Module: The target module 115.1 has been previously generated by a compiler or interpreter (not shown), based on computer source code (written in a known high-level programming language) which is typically generated by a human programmer or programming team (possibly in conjunction with automated code generation tools, and possibly integrated with third-party object code libraries). The target module is typically intended to be run with certain input data, or certain kinds of input data, on a known or contemplated hardware platform.

Run-time Environment: The known or anticipated hardware platform (or simulation software and parameters which characterize the platform), along with sample input data for the target module, together constitute the run-time environment 115.2 for input into the TMEA 105. In an embodiment, the run-time environment 115.2 may include a characterization or actual use of a target operating system for the environment.

Instruction Mix Breakdown: In an embodiment of the present system and method, the resulting output from the TMEA 105 is an instruction mix breakdown (IMB) 120 (which may also be referred to as an "object code classification"). The IMB 120, illustrated in FIG. 3 in pie-chart form, provides (i) an absolute characterization (that is, a numerical count) of how many times each of the various different machine-level (assembly language) instructions are actually executed by the target module during a real or simulated run-time (herein also "Machine Code Appearances" or MC_A); and/or (ii) a relative characterization (relative percentages) of the various different machine-level (assembly language) instructions that are actually executed by the target module during a real or simulated run-time. Details of this are discussed further below (see FIG. 3).

Hardware Platform and Timing Data: In an exemplary embodiment of the present system and method, the method 170 may entail a second step 170.2 of generating a platform timing data (PTD) 135 for the hardware platform 130. The hardware platform profiler (HPPR) tool 105.2 profiles the target hardware platform 130 to determine intrinsic or inherent timing data for microcode on the hardware platform 130.

As discussed above: During product research and development, engineers designing a real-time system, mission critical systems, or other computation systems may elect to evaluate one or more target hardware platforms to serve as system controllers. The target hardware platform(s) 130 may be, for example and without limitation: a microprocessor, a microcontroller, a controller system, a microprocessor or microcontroller with some additional microchips (such as memory, memory access chips, bus controller(s), I/O ports, and similar) mounted on a circuit board or backplane. In some embodiments of the present system and method, different or competing target hardware platforms 130 may be understood as the same hardware, but each platform running with different firmware. In some embodiments, different or competing target hardware platforms 130 may be understood as the same hardware, but each platform running with different operating systems or different versions of an operating system.

In an embodiment of the present system and method, the HPPR tool 105.2 may be executed on one of the Benchmarking Suite computers 110.2, and the HPPR 105.2 may obtain suitable operations data from the target hardware platform 130 via I/O ports and cables (or via wireless means) providing for data transfer. In an alternative embodiment, the HPPR tool 105.2 may be executed directly on a processor of the target hardware platform 130 itself in order to obtain real-time performance data from the target hardware platform 130. In an alternative embodiment, the HPPR tool 105.2 may be executed by software/firmware processes running concurrently or consecutively on a processor of the target hardware platform 130 and also on the Benchmarking Suite computer 110.2

The HPPR tool 105.2 obtains timing data for machine-level (also known as assembly language) instructions running on a target hardware platform 130. As is known in the art, machine level instructions are typically those instructions which are elements of the instruction set of a hardware microprocessor or hardware microcontroller of the hardware platform 130. However, machine level instructions may also include instructions from the instruction sets of other chips in the hardware platform 130, for example instruction sets of memory access chips, bus controllers, I/O hardware, digital signal processors, graphics processing chips, and other hardware-level instruction sets associated with the hardware platform 130. In some embodiments of the present system and method, machine level instructions may be construed as including byte-code instructions to be interpreted by a byte-level interpreter (as may be used for example with Java and similar programming languages).

As is known in the art, machine level instructions may include, for example and without limitation: instructions to retrieve data from memory for temporary storage in processor registers; instructions to store data to memory from processor registers; instructions to perform various arithmetic and/or logical operations on data currently in processor registers; instructions to track and jump to various memory addresses; instructions to send data to/receive data from various system bus and/or I/O ports; and numerous other low-level processor instructions.

Processor Timing Data: Timing data for any given machine level instruction may include, for example and without limitation: (a) the number of clock cycles required for the machine level instruction to execute; (b) an absolute time (in nanoseconds or other suitable timing units) for the machine level instruction to execute; (c) a system clock speed and/or system bus speed at which the timing data was obtained; (e) a number of bytes of data operated on by the machine level instruction; and (f) other numeric data pertinent to characterizing an actual amount of time and/or relative times required to execute the machine level instruction.

In some embodiments of the present system and method, the HPPR 105.2 may be configured to identify if a machine level instruction has different timing data depending on, for example, a byte-size of data on which the instruction operates. In some embodiments, the HPPR 105.2 may identifying one or more of an upper-timing bound for a machine-level instruction to operate; a lower-timing bound for a machine-level instruction to operate; an average (mean or median) time for a machine level instruction to operate; and/or other statistical distribution data for machine-level instruction operational times.

In some embodiments of the present system and method, the HPPR 105.2 may be configured to take into account that a single machine level instruction may require different run-times depending on variations in the input parameters.

Platform Timing Data: In some applications, actual timing data for a given microcode instruction may vary depending on whether the instruction timing is determined solely by processor performance or instead by full hardware platform performance (Memory speed, processor speed, cache bus speed . . . ). For example, the use of a memory cache or multiple levels of memory caches may influence execution time for a hardware platform as a whole (depending in part on the size and speed of cache memory).

The hardware platform profiler 105.2 may deliver, as output, platform timing data 135 for the target hardware platform as a whole. Platform timing data 135 may be enumerated in a variety of data formats, including ASCII listings (directly human-readable on standard displays and printouts), or in various hex or binary encodings.

The output platform timing data 135 will typically include the same types of data as described above for a hardware processor. That is, for each machine level instruction to be characterized, the platform timing data may include: Timing data 135 may include, for example and without limitation: (a) clock cycles; (b) an absolute time for the machine level instruction to execute (herein also "Machine Code Timing" or MC_T); (c) a system clock speed/bus speed; (e) a number of bytes of data operated on; and (f) other pertinent numeric data to characterize machine level instruction timing.

Selective (Target-Module-Specific) Analysis of Machine-Level Instruction Timings: In some embodiments of the present system and method, the HPPR 110.2 may limit its timing analysis to only those machine level instructions that are actually employed in a selected, target object code module 115 during module execution. In such embodiments, the HPPR 110.2 may receive as input the IMB 120 for the target module 115. The IMB 120 identifies which instructions are actually executed by the target module 115, so that the HPPR 110.2 can limit timing analysis to only the listed machine level instructions.

In alternative embodiment of the present system and method, the HPPR 110.2 profiles the timing of all machine level instructions for the target hardware platform 130. This provides a generalized timing list for the target hardware platform 130, which can then be used for further analysis of many possible target modules 115.

In an alternative embodiment of the present system and method, platform timing data 135 may be provided by the hardware platform manufacturer as part of a data sheet or other support literature for the hardware platform 130.

Benchmark Generation: In an exemplary embodiment of the present system and method, the method 170 may entail a third step 170.3 of generating a performance benchmark 150 which indicates an expected performance level of the target module 115 if the target modules 115 was executed on the target hardware platform 130.

The benchmark generator (BG) tool 105.3 receives the instruction mix breakdown (IMB) 120 and receives the platform timing data (PTD) 135. The BG 105.3 then employs IMB 120 and PTD 135 to calculate a performance benchmark 150 which is specific to the combination of at least (i) the target module and (ii) the target hardware platform.

In some embodiments of the present system and method, a given, generated performance benchmark 150 may be further specific to specific input test vectors 115.2" for a specific simulation run of a real-time system 200. In some embodiments of the present system and method, and for a particular given target module and target hardware platform, multiple passes may be made for generating a performance benchmark 150 (for example, with varied input test vectors), and a cumulative or averaged benchmark may be generated for the combination (that is, pairing) of the target module and the hardware platform.

As just one exemplary formulation, not intended to be limiting, the BG tool 105.3 may generate a performance benchmark 150, or generate a starting value for a benchmark (to be further refined), according to an exemplary benchmark formula:

(B1) Performance Benchmark[software module, hardware platform] (or PB[s,h])=

$$\sum_{k=1}^{CS} MC\_Timing_k \times MC\_Appearances_k$$

where:
CS=number of distinct machine level commands in the target module command set (CS), that is, the number of distinct machine-level commands which may potentially be executed by the target module 115, $MC\_Timing_k$=the timing (absolute or clock cycles) for the $k^{th}$ machine-level command to execute a single time (obtained from the platform timing data 135), and $MC\_Appearances_k$=the number of times the $k^{th}$ machine-level command appears during execution when the hardware platform 130 is executed on the target module 115 (obtained from the instruction mix breakdown 120).

Elsewhere below, $MC\_Timing_k$ is sometimes abbreviated as MC_T, and $MC\_Appearances_k$ is sometimes abbreviated as MC_A.

The generation of a performance benchmark 150 is discussed further throughout this application, and in particular in conjunction with FIG. 5 below. The steps of the exemplary method 170 are summarized here:

Step 170.1: Obtain the instruction mix breakdown (IMB) 120 for the target module (TM) 115.1 and run-time environment (RTE) 115.2;

Step 170.2: Obtain the platform timing data (PTD) 135 for the hardware platform (PT) 130;

Step 170.3: Based on the IMB and PTD, calculate a single performance benchmark 150.

Optionally, the method 170 may entail generating additional performance benchmark s 150 for different modules 115 running on different hardware platforms 130, and further generating comparative performance benchmark s 155.

In some embodiments of the present system and method, method step 170.2 may be performed prior to (or concurrent with) method step 170.1.

The steps 170.1 through 170.3 are exemplary only, and alternative or additional steps may be performed consistent with the appended claims for the present system and method.

IV. Exemplary Real-Time System

Figure 2B:
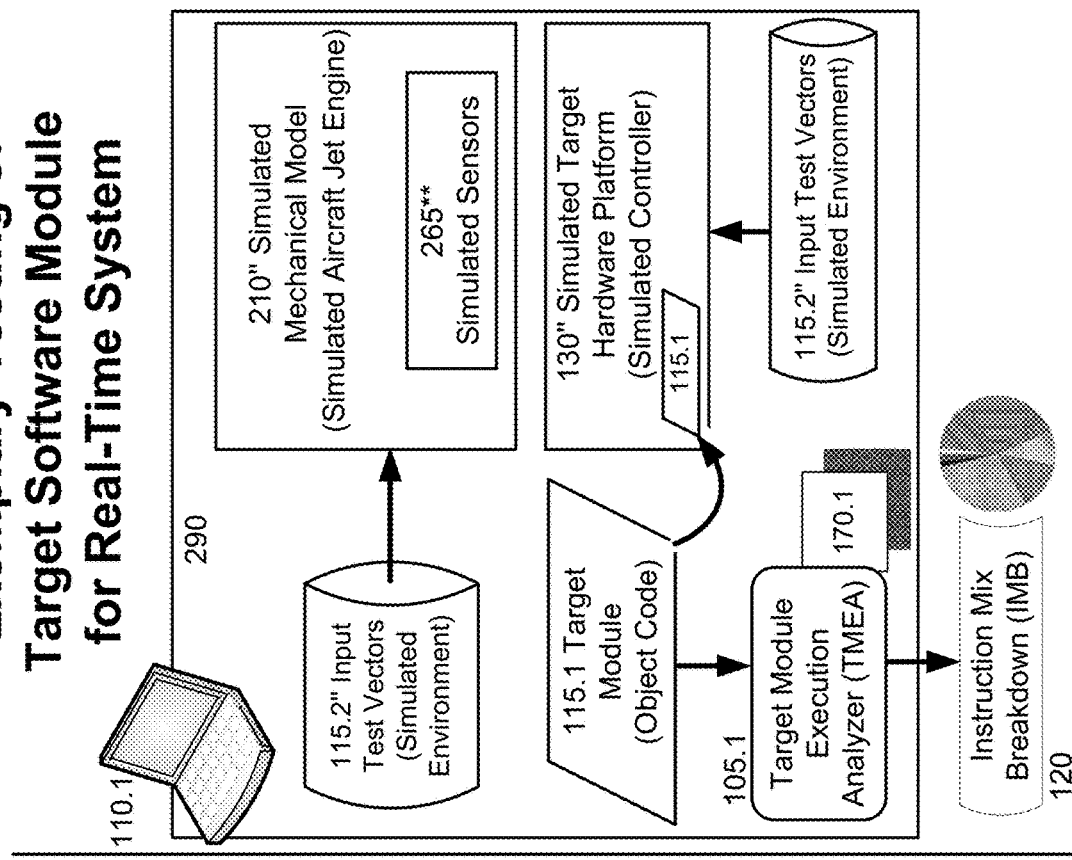
FIG. 2B illustrates a simulation process which may be employed during the design/analysis phase for a real-time control system.
Figure 2A:
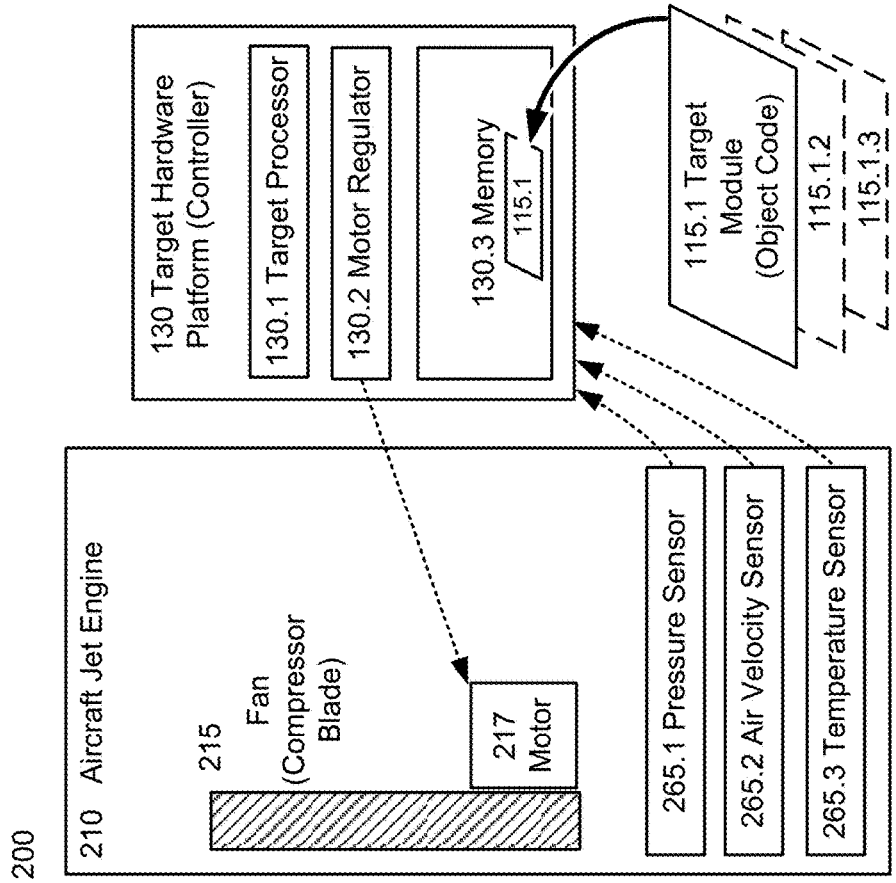
FIG. 2A presents a block diagram of exemplary real-time control system (RTS) for which the present system and method may be used to aid the design/development process.

FIG. 2A is a block diagram of an exemplary real-time/mission-critical system (RTS) 200 which may be in a planning stage, design stage, or development stage (or an upgrade or redesign phase), for which the present system and method may be used to aid the design and development process.

The real-time system 200 is exemplary only and not limiting; RTS 200 is just one of many possible such systems for which the present system and method could be used, and is selected in this document for illustration only. There is no implication, and it should not be inferred, that the present system and method is confined to applications in engine design, or confined to the field of aviation, or any other similar limitation. To the contrary, the present system and method is applicable to the design and development of real-time systems and mission-critical systems across a wide spectrum of technology fields.

Physical real-time system vs. Simulation real-time system: Persons skilled in the art will appreciate that development of a real-time system (RTS) 200 generally aims for implementation of a concrete, physical structure or system which may include many kinds of tangible hardware, electrical components, structural components, data processing components, and other parts 130, 210, 215, 217, 265, as well as RTS software 115. During system development, one or more tangible, physical prototypes may be developed. Additionally, during system development, an entire physical real-time system 200 may first be designed and then simulated, in whole or part, via one or more simulation programs 130", 210", 265" which may, for example, be run on one or more computers 110. Details are discussed further below.

In one exemplary application of the present system and method 100 for technology design, RTS 200 may be an aircraft jet engine 210. The block diagram of aircraft jet engine 210 omits numerous required elements of actual jet engine design, and so includes only a handful of selected elements for purposes of explanation and illustration.

Jet engine 210 may include an air-intake fan 215 or compressor blade(s) 215 or similar, for which the speed of fan rotation is controlled by a motor 217. The rotation speed of motor 217, and therefore of fan 215, is in turn controlled by a hardware fan controller 130, which constitutes the target hardware platform 130 in this example. In development, multiple different hardware fan controllers 130 may be under consideration (that is, be "targets" for purposes of this disclosure) for the final aircraft engine 210 design. The hardware fan controller 130 may include a microprocessor 130.1, a motor regulator 130.2, and a memory 130.3, as well as other digital and analog elements not illustrated.

Memory 130.3 may be used to store a fan controller application software 115.1, which is an exemplary target module 115 for benchmarking/assessment according to the present system and method. The target fan controller application 115.1, or a target software module 115.1 of the overall application, may regulate or help regulate the speed of motor 217 and therefore fan 215.

It will be noted that, during engine development, typically only one target module 115.1 may be employed or evaluated at a given time on one particular processor/computer 110.1. In alternative embodiments of the present system and method, the TMEA 105.1 may be configured to evaluate multiple TM+RTEs 115 at a same time, each running in separate evaluation processes.) Over the extended course of engine development, multiple similar-but-differently-coded target modules 115.1 (for example, 115.1.1, 115.1.2, . . . 115.1.$n$) may be designed and tested for possible use with hardware controller 130.

For performance benchmark evaluation at separate times (or for concurrent benchmark evaluation on separate processors/computers 110.1, or separate processes of TMEA 105.1) each such different target-module 115.$n$ may be loaded into memory 130.3 for general testing and evaluation; in particular, each such different target-module may be benchmarked by TMEA 105.1 of the present system and method.

In the present exemplary application, target module 115.1, once loaded into memory 130.3, may contain object code directs the hardware processor 130.1 to: (i) accept various local environmental data from sensors 265; (ii) analyze and/or process the received sensor data in real-time to determine or fine-tune a desired rotation speed for fan 215; and (iii) adjust motor 217 in real-time to ensure that the fan 215 is rotating at the desired rotation speed.

It will be apparent to persons skilled in the art that, given the options of multiple different possible fan controllers 130 and the options of multiple different versions of target modules 115.1, design engineers will seek to identify an optimum matching/combination of a selected target module 115.1 and a selected fan controller hardware 130. The benchmarking systems and methods disclosed herein are configured to aid in identifying one or a few optimum hardware controllers 130, one or a few optimized target modules 115.1, and an optimum combination of hardware controller 130 (including possibly an optimal choice of processor 130.1) and target module 115.1 code.

V. Exemplary Simulation Process and Target Module Benchmarking

FIG. 2B is a block diagram illustrating exemplary elements of, and data flow for, a simulation process 290 which may be employed during the design/analysis phase for real-time system (including, but by no means limited to) the exemplary real-time systems discussed above in conjunction with both of FIG. 1 and FIG. 2A. The simulation process 290 may be run for example on a computer 110 such as computer 110.1 of the Benchmarking Suite 102. In an embodiment of the present system and method, the simulation process 290 may be used to implement method step 170.1 of exemplary method 170 above to generate the instruction mix breakdown (IMB) 120.

The simulation 290 may include one or more software/firmware mechanical models 210" such as, for example and without limitation, a simulation engine 210" which emulates the structure and function of an aircraft engine. The simulated engine 210" may include, among other elements, functions, software objects, and modules, one or more simulated sensors 265" (which may simulate sensors 265 of aircraft jet engine 210). Hardware design simulations in general are known in the art, and further details are not provided here.

In an embodiment of the present system and method, the simulation 290 may also provide for a software-only, simulated target hardware platform 130", which may simulate for example the target hardware platform controller 130 of exemplary system 200. In an embodiment of the present system and method, the target hardware platform controller 130 may be integrated into the simulation process in the form of an actual controller 130, with suitable communications links and data transfer means (not shown in FIG. 2A) between the actual, physical target hardware controller 130 and computer 110.1.

Combination Simulation and Physical System: In an alternative embodiment of the present system and method, the target hardware platform controller 130 may be implemented as a combination of some actual hardware (for example, an actual target microprocessor 130.1) and software objects which emulate other elements of the target hardware controller 130 (for example, software emulation of the motor regulator 130.2). In embodiments of the present system and method, the implementation of a simulated hardware controller 130" may include a simulated operating system (not shown in FIG. 2B). In alternative embodiments of the present system and method, the simulation 290 may incorporate real physical system 210 with a wholly or partially simulated target hardware platform 130; or a wholly physical target hardware platform 130 with a simulated mechanical model 210".

More generally, the target hardware platform controller 130 may be implemented as a combination of some actual hardware (for example, an actual target microprocessor 130.1) and software objects which emulate other elements of the target hardware controller 130 (for example, software emulation of the motor regulator 130.2). In embodiments of the present system and method, the implementation of a simulated hardware controller 130" may include a simulated operating system (not shown in FIG. 2B).

In one embodiment of the present system and method, and as illustrated in FIG. 2B, the RTS simulation process 290 may have integrated into it, or execute as needed, the target module execution analyzer (TMEA) 105.1 of the Benchmarking Suite 102. In an alternative embodiment of the present system and method (not shown in FIG. 2), the TMEA 105.1 may be run as a primary computer application or tool, and TMEA 105.1 may link to, integrate into itself, or call as a separate process the hardware simulation 290. (As a consequence, the particular arrangement of software modules and functions, as shown in FIG. 2A, will be understood as exemplary only and not limiting.)

In some embodiments of the present system and method, the RTS simulation process 290 is executed primarily or exclusively to execute the functions of TMEA 105.1. In an alternative embodiment, the RTS simulation 290 may further include or implement simulation tasks apart from those of the TMEA 105.1 (for example, simulating and determining other aspects of engine performance or efficiency).

In execution, the RTS simulation process 290 will accept as input, or have integrated within as stored data structures, a variety of input test vectors 115.2" which represent a simulated environment 115.2. In the present, exemplary case of an aircraft engine simulation 290, the input test vectors 115.2" may include, for example and without limitation:

(i) parameters to describe/characterize demands or control signals for an aircraft engine which pertain to or are derived from desired aircraft speed, desired aircraft altitude, desired or necessary engine performance if a second engine fails, and other factors determined via aircraft pilot choice or demands of a physical environment (such as external wind velocity); and (ii) parameters to describe/characterize a hypothetical environment immediately local to an aircraft engine or interior to the aircraft engine, such as appropriate pressure data, interior engine air velocity data, temperature data, etc.

In operation, the RTS simulation 290 loads the target module object code 115 into a real and/or simulated target hardware platform 130/130" for execution by the target hardware platform; initiates simulated operations of the simulated aircraft jet engine (210"), as controlled by the real/simulated target hardware platform 130/130"; and accepts suitable input test vectors 115.2".

During the simulation run, the target module execution analyzer (TMEA) 105.1 monitors the real/simulated target hardware platform (130/130") to determine which machine level (assembly) instructions are executed by the target hardware platform; and to determine how many times any specific machine level instruction is run. The TMEA 105.1 provides, as an output, an instruction mix data breakdown (IMB) 265 for the simulation run.

Persons skilled in the relevant arts will appreciate that identifying which machine instruction(s) are being executed by a hardware processor in real-time, or have been executed by a hardware processor 130.1, is known in the art. For example, with some hardware microprocessors 130.1, the currently running instruction may be read from a hardware level instruction register. Details may vary with different hardware platforms 130 and/or different hardware processors 130.1. The details are not discussed in this document.

In summary, and in an embodiment of the present system and method, an exemplary method 170.1 for obtaining the IMB 120 entails (see also FIG. 3 below):

(i) Executing the target module object code (115.1) along with suitable input test vectors 115.2" (to simulate an environment 115.2) on a simulated target hardware platform 130";

(ii) During the simulation run, identifying each machine-level command 320.*n* executed by the simulated target hardware platform 130"; and (iii) Maintaining a list 120 with an execution count 330 of how many times each machine level command 320 is executed by the simulated hardware platform 130".

Alternative method to generate IMB 120: In an alternative embodiment of the present system and method, an exemplary alternative method 170.1' (not shown in the figures) for obtaining the IMB 120 may entails:

(i) Introducing into the source code (for example, C++, Java, etc.) for the target module 115.1 one or more flags or markers which reflect estimates (as determined by a software programmer or system engineer) of the frequencies with which some portions of the code are expected to be executed. For example, each instruction loop may include a specific, programmer-provided flag which estimates a number of times the programmer estimates that the loop may run). It will be understood by persons skilled in the art that such flags are of course only estimates, and are necessarily independent of any input test vectors 115.2" which may simulate a real-world environment.

(ii) Generate, via a suitable compiler (not shown in the figures), a target object module 115.1 which include object module flags indicative of the source-code flags. For example, object code which implements a loop may be preceded by an object-module flag indicating the estimated number of times the loop is anticipated to be run.

(iii) Parse the object code 115.1 (for example, by the TMEA 105.1) to identify both the machine level instructions 320 in the code, and the object-module flags which estimate how many times a section of code may be executed.

(iv) Generate the IMB 120 based on the machine level instructions in the object module and the estimated execution values reflected in the flags.

Persons skilled in the art will appreciate that such an alternative method 170.1' may be less accurate than a method which entails running the object module 115.1 in a simulated environment. Alternative method 170.1' may be used, for example, in design phases when a simulated mechanical model 210" and/or a simulated target hardware platform controller 130" are not available.

VI. Exemplary Instruction Mix Breakdown

FIG. 3 illustrates an exemplary instruction mix breakdown (IMB) 120 which may be generated by the target module execution analyzer (TMEA) tool 105.1 based on an exemplary run-time analysis of a target module 115.1 on an exemplary target hardware platform 130 for an exemplary simulated environment 115.2.

Exemplary IMB 120 identifies an instruction list 320 of machine level instructions (also called opcodes or assembly language instructions) executed on the target hardware platform 130 during a simulation run of the target module 115.1, given the input test vectors 115.2" for a simulated environment 115.2. The list 320 shown in FIG. 3 is exemplary only, and depending on a processor 130.1 and on details of the target hardware platform 130, an instruction list 320 may contain completely different and/or additional or fewer opcodes.

For each respective instruction 320.1, 320.2, . . . 320.*n* detected during execution, the IMB 120 may identify an absolute number of times that the instruction was executed (ANTIE) 330, and/or a relative number of times the instruction was executed (RNTIE) 335 as compared with a total count 340 of executed machine-level instructions. In an embodiment of the present system and method, the IMB 120 may also include a visual breakdown of the relative or absolute instruction usage, such as exemplary pie chart 325. Such pie charts 325, or other visualizations of the instruction breakdown, may aid computer programs in analyzing the performance of the object code, and in refining the source code for better performance.

As discussed elsewhere in this document, and in accordance with the present system and method, the IMB 120 may be combined or integrated with platform timing data 135, via suitable calculations, to obtain a single performance benchmark 150 for the particular combination/pairing of a target hardware platform 130 and a target module 115.1.

In one embodiment of the present system and method, a single simulation run may be used to generate an IMB 120 for a particular pairing of a selected target hardware platform 130 and a selected target module 115.1. However, it may be the case that, even for a particular pairing selected target hardware platform 130 and selected target module 115.1 the numerical breakdowns of instructions 330, 335 may vary depending on the particular input test vectors 115.2" for a simulation run. Therefore, in some embodiments of the present system and method, the TMEA 105.1 may perform multiple simulation runs on a same pairing of hardware platform 130 and target module 115.1. The results of the multiple runs may be averaged, or otherwise statistically analyzed, to generate more accurate numeric profiles 330, 335 of the instruction set usage.

Supplemental Hardware Platform Instruction Sets: In some practical applications, a hardware platform 130 may have other, supplemental or additional low-level instruction sets 320 which pertain to hardware other than the primary microprocessor 130.1. For example, other microchips such as floating point units (FPU), cryptography processing units, digital signal processing (DSP) chips or sensor control chips may have their own microcode commands. These additional microcode commands may be sent to the applicable microchips (DSP, sensor control, etc.) via a variety of hardware means, including possibly as parameters of port calls made via the target processor 130.1 or via direct memory access (DMA) between memory 130.3 and the applicable microchips. In an embodiment of the present system and method, the TMEA 105.1 may be configured to identify such supplemental microcode commands in the target module 115.1, and to determine a number of times such supplemental microcode instructions are executed during run-time.

Privacy of Target Module Operations: It will be noted that, in some embodiments of the present system and method, an instruction mix breakdown IMB 120 contains such data as which particular machine level instructions 320 have been run by a real/simulated target hardware platform controller 130, and how frequently 330 each such instruction is run (or, in some embodiments, a relative percentage 335 of times each instruction is called compared to other assembly instructions). However, the IMB (120) does not require, and in some embodiments of the present system and method does not contain, any indication of the order or sequence in which the instructions are called. As a result, and in various embodiments, while the IMB 120 is indicative of which opcodes 320 of a controller instruction set are called and with what frequency by an operative target module 115; the output of the IMB 120 effectively concealing the detailed operations and operational principles of the target module 115. In this way, the IMB 120 reveals data pertinent to operational efficiency of program execution, while hiding or "firewalling" details of code execution.

VII. Exemplary Platform Timing Method

In embodiments of the present system and method, the hardware platform profiler (HPPR) tool 110.2 is employed to analyze a target microprocessor 130.1 or a target hardware platform 130 (which typically includes a microprocessor 130.1) to obtain timing data 135 for some or all of the microcode instructions of the platform/microprocessor 130.1. In discussion below, the term target hardware platform 130 (or simply target platform 130) is used to refer, interchangeably, to either of the full platform 130, or selected processing elements thereof such as the target microprocessor 130.1

In one embodiment, the HPPR tool 110.1 is communicatively coupled with a target hardware platform 130 in order to control the target hardware 130 via software, thereby obtaining timing data. In an alternative embodiment, the HPPR tool 110.1 may be executed directly by the microprocessor 130.1 of the target hardware platform 130, in order to obtain platform timing data 135.

FIG. 4 presents a flow-chart of an exemplary method 170.2 to obtain microcode timing for a target hardware platform 130.

Method 170.2 begins with step 405. In step 405, the method established or obtains a list of M microcode commands 320 for which timing data is to be obtained. This list may be created based on various different sources or means, including for example and without limitation: (i) Obtaining a full list of microcode commands 320 for the target platform 130, for example from a manufacturer spec sheet; (ii) Creating (based on engineer or programmer-made selections) a list with a subset of the full platform microcode commands 320; (iii) Using a target-module specific list of microcode commands 320 for a specific hardware platform 130, based on an output of the TMEA 105.1.

The method continues with step 410. In step 410, a specific microcode command $m_i$ is selected from the list of microcode commands.

The method continues with step 420. In step 420, the method creates a software timing function or software timing routine to execute each microcode command multiple times 'N' in a row, in loop fashion (exemplary values for N may range from 2 to 100, or even values higher than 100). The timing function/routine may initially be generated in a high-level language or as a high-level macro commands, but is compiled (if needed) to the direct machine/microcode commands to be fun. In an alternative embodiment, the value of N=1, meaning the selected microcode instruction is executed only once.

In an embodiment of the present system and method, generating the timing microcode entails coding a looped-instruction execution function (LIEF) for the selected microcode command; and also employing compiler flags which direct a compiler to unroll the loop, so that the selected microcode command is actually called multiple times in succession in the timing microcode. This circumvents/prevents measuring the time for the jumps/branches within a loop.

For microcode commands which require one or more parameters, and in some embodiments of the present system and method, a sub-step 420.1 may generate, encode, or select a single set of one or more appropriate values for the parameters. In alternative embodiments of the present system and method, a sub-step 420.2 may generate, encode, or select a two or more sets of parameters, each set having a different parameters value or different parameter values from other sets. In this way, the microcode command may be run multiple times with different parameters to account for the fact that different parameter values and data sizes may result in different execution times for the microcode command.

In embodiments, the high-level code (such as code written in C++) for the LIEF is coded to be sufficiently generic that it may be compiled for, and run on, hardware processors with entirely different instruction sets, for example, Power PC, ARM, X86, and other processor families.

In pseudocode form, an LIEF which is exemplary and not in any way limiting may, and which is for an exemplary "add and store" microcode command, may contain the microcode:

```
(B2) timing_loop_for_'add-store' command{
    addstore (A1, B1)
    addstore(A1, B2)
    addstore(A2, B3)
    addstore(A2, B4)}
```

The exemplary microcode (B2) executes an addstore ( ) command four times (N=4), where for example addstore (A, B) may retrieve a first numeric value from memory address A, retrieve a second memory value from address B, add A+B, and store the resulting value back to memory address A. In an embodiment, different parameter values A1, A2, B1, B2, B3, B4 may be employed each time the addstore (A, B) command is executed. In an alternative embodiment, same parameter values A, B may be employed each time the exemplary addstore (A, B) command is executed.

Exemplary method 170.2 continues with step 425. In step 425, a start_time for LIEF execution is obtained.

In step 430, the LIEF is executed on the target platform 130, resulting in (by inherent coding of the LIEF) N successive consecutive executions of the selected microcode command.

In step 435, an end-time for LIEF execution is obtained.

In step 440, a total time for the LIEF execution is obtained as: total-execution-time (TET)=end-time−start-time.

In step 445 of exemplary method 170.2, a microcode execution time (MC_T) is obtained for the selected microcode command as MC_T=total-execution-time/N.

The method then returns step 410 where a different specific microcode command is selected from the list of microcode commands. The method is repeated until MC_T data has been generated for all the commands on the list.

Table 1 (T1), immediately below, presents an exemplary output platform timing data (PTD) 135 of the method 170.2 as applied to an exemplary microprocessor 130.1. The output PTD 135 is exemplary only and includes only a small subset of the commands of a typical microprocessor; is in no way limiting; and does not necessarily represent the actual microcode commands or command execution times of any known microprocessor:

TABLE 1

| Platform Timing Data (PTD) (Exemplary Microcode Timings) | |
|---|---|
| Microcode Command | MicroCode Execution Times (MC_T) (nanoseconds) |
| C_Add | 5 |
| C_AddStore | 10 |
| C_Branch | 3 |
| C_Compare | 7 |
| C_IntMult | 12 |
| C_LoadRegister | 5 |
| C_Store | 5 |
| C_Subt | 5 |

In an alternative embodiment of the present system and method, and for some hardware microprocessors which have a dedicated hardware register to reflect the execution times, microcode execution times may be retrieved directly from the microprocessor.

Supplemental Hardware Platform Instruction Sets: As noted above, a hardware platform 130 may have other, supplemental or additional low-level instruction sets 320, which may pertain, for example and without limitation, to floating point units (FPU)'s, cryptography processing units, digital signal processing (DSP) chips or sensor control chip microcode sets. In an embodiment of the present system and method, the HPPR 105.2 may be configured to determine the amount of time required for the hardware platform 130 to execute such supplemental microcode commands.

Comparing Target Hardware Processors: In the development of the present system and method, testing has demonstrated that when a selected target module 115.1 is executed on different underlying target hardware platforms 130, the execution speeds for various comparable microcode commands can be significantly different. Variations in target microprocessor 130.1 design, such as the presence of a floating point unit or lack of a floating point unit, the sizes data caches, and RAM speed can and do result in notable differences for timing scores (for example, for the commands of the PPC instruction set vs. the ARM instruction set). Functionally same or similar commands display different times for a given, same instructions on each platform. The present system and method is designed to detect these differences, and to identify their implications for real-time performance for a given target module (which may have a same or nearly identical high-level language coding across different hardware platforms).

It will be noted that once a given target processor/platform 130.1/130 has been benchmarked to obtain MC_T, the same set of timing data MC_T (for the given target processor/platform 130.1/130) can be used for benchmarking many different target modules/environments 115 for that platform 130.

In alternative embodiments of the present system and method, and in lieu of employing the hardware platform profiler 105.2, platform timing data 135 may be obtained from a manufacturer's specifications for a target processor 130.1 and/or target platform 130.

VIII. Exemplary Benchmark Generation

As discussed above, the Benchmark Generator (BG) tool 105.3 is configured to accept as input an instruction mix breakdown 120 for a target module 115.1 and a platform timing data 135 for a given hardware platform 130; and to provide as output a suitable benchmark score 150 indicative of the expected real-time performance of the target module 115.1 on the target hardware platform 130. The benchmark score 150 is indicative of the expected real-time performance. Benchmark reflects that the benchmark scores generated by the present system and method are expected to be approximately predictive of the relative performances of different combinations of target modules 115.1 TM and hardware platforms 130 HP.

Discussed above was one exemplary formula (PB1) for generation of the performance benchmark 150 (also referred to as a "benchmark calculation"), which is reproduced for convenience in FIG. 5. Also shown in FIG. 5 are two other exemplary formulas (PB2) and (PB3) for generation of a performance benchmark 150.

Exemplary formula B1 combines the timing MC_Timing for the processor microcode commands and the absolute number of times MC_Appearances 330 each microcode command is run to arrive at a performance benchmark value PB[s,h]. Employing the exemplary performance benchmark formula (PB1) for PB[s,h], it will be apparent to persons skilled in the art that:

(i) if a first target module TM.1 is executed on a first hardware platform 130 HP.1 and then executed on a second hardware platform 130 HP.2; and further (ii) if the most frequently-used machine level commands take longer to executed on platform HP.2 than on platform HP.1, then (iii)

the performance benchmark value PB2[s,h] for platform HP.2 will typically have a higher value than the performance benchmark value PB1[s,h] for platform HP.1. So for exemplary benchmark calculation (PB1), slower target-module/hardware-platform combinations will typically yield a higher performance benchmark value PB.

In some embodiments of the present system and method, it may be desirable to consider PB [s,h] generated by PB1 as in intermediate benchmark value; and then generate a final benchmark 150 PB_final, for example an inverse value so that PB_final[s,h]=1/PB[s,h]. In such an embodiment, if platform HP.2 performs more slowly than for HP.1, the performance benchmark value PB for platform HP.1 is higher than the performance benchmark value for platform HP.2. (That is, lower performance benchmark values would reflect a lower-ratio performance).

Similarly, employing the exemplary formula PB1, and in an exemplary application of the Benchmark Suite:

(i) two target modules 115 TM.1 and TM.2 may be generated which will both run on a same hardware platform 130 HP;

(ii) each of the modules TM.1 and TM.2 may be coded to have a highly similar or identical functionality, but are coded differently or optimized differently (possibly with any or all of different source-level languages, different compilers, different code optimizations, or different code organization and design);

(iii) if, compared to module TM.2, module TM.1 makes more frequent use of fast-executed machine level commands for platform HP, and/or TM.1 makes less frequent use of more slowly-executed machine level commands for platform HP as compared with module TM.2, then the exemplary formula PB1 above for PB[s,h] will typically indicate or reflect that module TM.1 will have a lower performance benchmark value PB[s,h] as compared with target module TM.2.

Here again, and in some embodiments of the present system and method, it may be desirable to generate a derivation/final performance benchmark, such that if a module X performs faster than a module Y, then X will have a higher performance benchmark value as compared with module Y.

FIG. 5 also defines another exemplary benchmark formula or calculation PB2 which may be employed with the present system and method. Performance benchmark calculation PB2 is similar to PB1, but instead employs a relative number of times RMC_A 335 a particular microcode command is executed by the target hardware platform when running the target module 115.

FIG. 5 also defines another exemplary performance benchmark formula or calculation PB3 which may be employed with the present system and method. Benchmark calculation PB3 is similar to B1, but further includes one or more numeric weighting factors 510 associated with some or all of the microcode commands. The weighting factors, which may be established or determined (for example) by system design engineers, may favor certain microcode commands and their timings or execution frequencies over others in the overall calculation of a benchmark PB3. These factors may be chosen, for example, if design engineers believe that certain types of microcode commands (such as memory access commands, cached commands or cache control commands, branch commands, or some kinds of arithmetic commands) should be favored over others in benchmark calculations.

Other benchmark embodiments: It will be understood that the benchmark calculations PB1, PB2, and PB3 are exemplary only, and other benchmark formulas, calculations, or algorithm may be employed consistent with the scope of the appended claims. For example, benchmark calculations may employ various adjustments designed to scale and/or cluster benchmark scores; so that, for example and without limitation, a first pairing of slower-hardware platform with a better-coded (faster) object modules yields approximately a same benchmark values as a second pairing of a faster-hardware platform with a less efficiently-coded (slower) software module. Alternative adjustments may be employed provide different relative weightings between hardware platform performance and target module performance.

It will be further understood by persons skilled in the art that, while a while multiplication operation is employed in all of exemplary formulas PB1, PB2, and PB3, this is exemplary only. Other arithmetic operations and/or inclusion of other mathematical functions may be employed to yield an effective benchmark formula PB[s.h] based on the combination of platform timing data (PTD) 135 and instruction mix breakdown (IMB) 120.

Normalization: In some embodiments of the present system and method, it may be desirable to normalize a benchmark formula 150 to a common standard. For example, a first formula may yield an intermediate value, which is then normalized to a common standard. In some embodiments, an appropriate normalization factor may be identified over the course of time as the present system and method is put into use. For example, it may be desirable to normalize a benchmark formula so that the final benchmark result 150 is substantially the same as the actual time it will take a target software module 115 to execute on a target hardware platform 130. Over time, it may be found that in initial formula typically delivers a value which indicates a lower execution time than an actual execution time, once the target module 115 is actually run on the target platform 130. In such a case, a suitable normalization may be introduced so that a final benchmark value 150 is typically very close to an actual execution time. Other normalizations may be envisioned as well.

Common Benchmark Formulation for a System Analysis: Above, several exemplary performance benchmarks formulas 150 (PB1, PB2, PB3) have been presented as alternative benchmark calculations. In some embodiments of the present system and method, and for purposes of design evaluation of object modules 115 (software) and hardware platforms 130, it is anticipated the design engineers will utilize a particular, common performance benchmark (for example, one of PB1, PB2, or PB3) to evaluate multiple different potential hardware/software combinations.

IX. Comparative Benchmarks

In embodiments of the present system and method, a goal of the Benchmark Suite 102 is to aide in the development of optimum designs for real-time, often mission-critical systems 200. In the development process, design engineers may consider multiple alternative hardware platforms 130 to serve as controllers for (and to be integrated into) a real-time system. Also in the development process, and for any one potential hardware platform 130, design engineers may propose and evaluate multiple alternative software architectures with multiple alternative software modules 115.

A single hardware platform 130 may possibly be able to run several different software modules 115; similarly, a single potential software module 115 may be able to be executed on several different potential hardware platforms 130. (In some instances, a single software module written in a high-level languages may be compiled into different target object modules 115, each employing different machine level code 320 suitable for different target hardware platforms 130.) The Benchmark Suite 102 of the present system and method may aide design engineers in evaluating and comparing different combinations of software modules 115 and hardware platforms 130, to determine which combination(s) are likely to deliver the optimum performance (usually the fastest performance) for a given task.

In embodiments of the present system and method, and based on multiple simulation runs with varied hardware platforms 130 and/or varied target modules 115, the BG tool 105.3 may generate comparative benchmark values 155 and/or comparative performance statistics 155 for different combinations/pairings of target hardware platforms 130 and various target modules 115. in real-world use.

Figure 6:
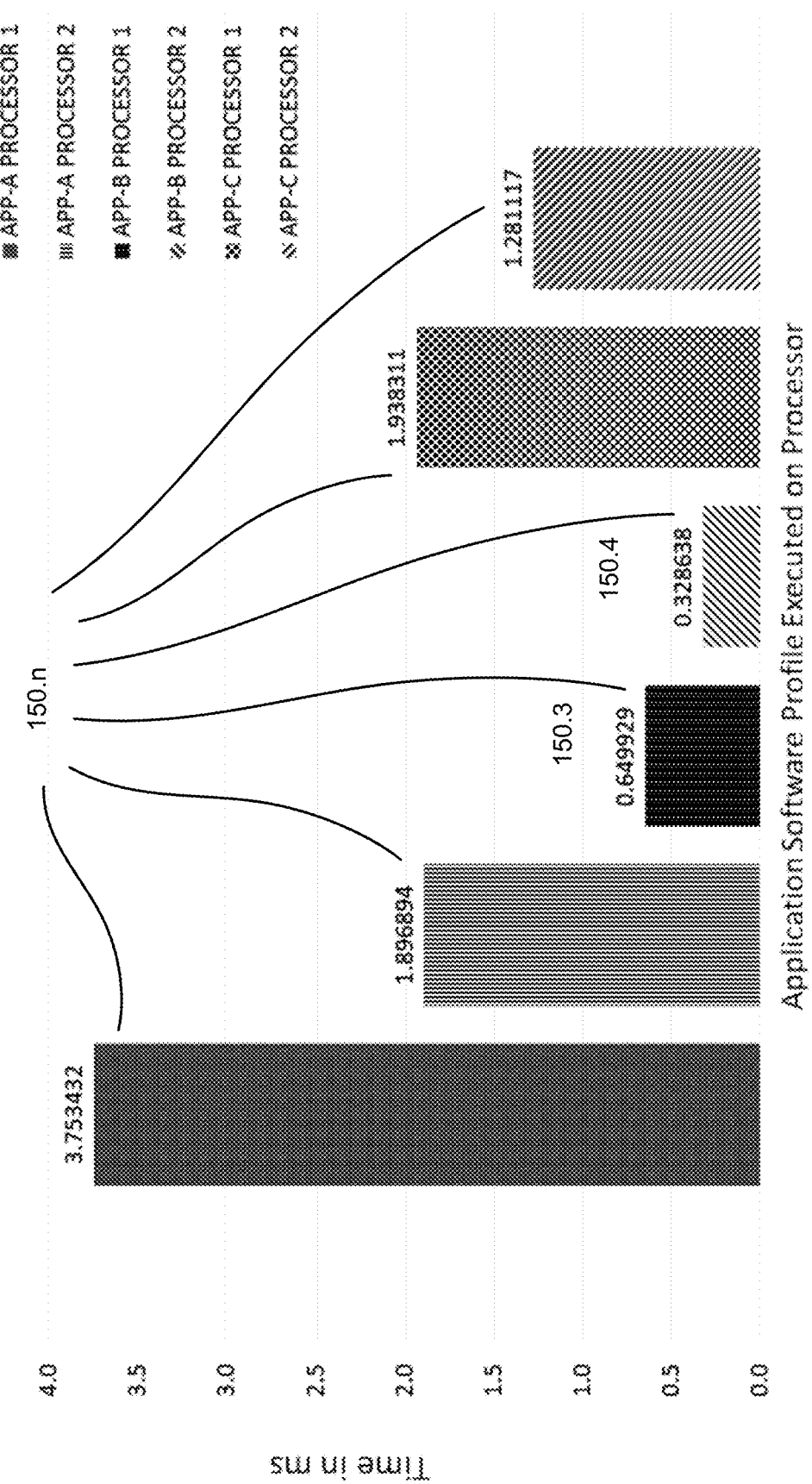
FIG. 6 illustrates exemplary comparative performance benchmark values for different exemplary combinations of target hardware systems and target software modules.

FIG. 6 illustrates in chart form 155 an exemplary comparative benchmark 155 which compares benchmarks 150 obtained, via the present system and method, when evaluating their different target modules 115 (in the figure, applications, for example "APP-A", "APP-B", "APP-C") and their performance when executed on either of two different target hardware processors 130 ("Processor 1", "Processor 2"). It will be understood that in order to obtain valid comparisons, all six benchmarks (150.1, 150.2, . . . 150.6) shown in FIG. 6 will be obtained via application of a single type of benchmark calculation 150, for example, just B1, just B2, or just B3. In the exemplary embodiment illustrated, the units of the benchmarks 150.*n* are milliseconds, and higher benchmarks reflect longer execution times, that is, slower performance.

It will be apparent that in the example illustrated, the execution of APP-B on hardware processor 2 yields the best performance benchmark 150.4 (at 0.328638 milliseconds), the execution of APP-B on processor 1 yields the second best performance benchmark 150.3 (at 0.649929 milliseconds), and in general that APP-B appears to deliver better task performance (that is, higher speed performance) than either of APP-A or APP-B. Based on such analysis and comparisons, system design engineers may make decisions regarding which application/processor combinations to use for a controller.

It will be apparent to persons skilled in the relevant arts the generation of only six benchmark values 150 is exemplary only, and that many more combinations of application modules 115 and hardware processors 130 may be evaluated and compared.

Exemplary Comparison Applications: It will be apparent to persons skilled in the relevant arts that, in alternative embodiments, more fine-grained or detailed benchmark comparisons 155 may be generated. These may include, for example and without limitation:

(A) Comparing benchmarks which are generated for a triplet combination such as different hardware processors 130, different object modules 115.1, and different input test vectors 115.2" (simulating different environments and operating conditions 115.2).

(B) Comparing benchmarks generated for a triplet combination such as different hardware processors 130, different object modules 115.1, and different configurations of support hardware for processing (such as different configurations of cache memory or different amounts of memory for controller memory 130.3).

(C) Comparing benchmarks for target modules generated using different compilers (from the same source code); and/or benchmarks generated for multiple target module all generated from a common source code and using a common compiler, but with different compiler optimization settings.

(D) In an embodiment, the system and method may generate multiple unique benchmarks for a single, same object code module for each one of multiple processors, so that the system and method may determine which hardware processor (among the multiple potential processors or "target platforms") is optimal for the code module.

(V) In another embodiment, the system and method may generate, for a single designated processor, multiple performance benchmarks, with a unique benchmark for each code module of multiple target software modules, with a goal of selecting just one of the target software modules for actual use and deployment. Each of the multiple software modules may have a same or similar functionality but have variations in detailed code or algorithms. In this way the system and method may identify those code variation(s) which is/are optimal for a particular designated target platform (for example, a particular designated hardware processor).

(E) In another embodiment of the present system and method, multiple different target software modules have different functionalities (for example, controlling different hardware components of a jet engine), and the multiple target modules are intended for combined (that is integrated) performance (possibly operating in parallel or in sequence, or both). Each target module may then have a very different code set.

The present system and method may generate a first set of benchmarks for each target module when run on a first processor or first target hardware platform, then generate a second set of benchmarks for each target module when run on a second (different) target processor or different target hardware platform, etc. In this way, and guided by benchmark results for multiple different co-operative target modules, design engineers may select a target hardware processor which provides adequate performance times for all of the target software modules (and so provides optimum performance for an integrated software system of all the target modules).

Other combinations of simulation variations, along with the pairings of modules 115 and processors 130, may be envisioned as well within the scope of the appended claims.

X. Exemplary Computer for Benchmarking

FIG. 7 presents a block diagram or system level diagram of an exemplary benchmarking computer 110, such as any of computers 110.1, 110.2, and/or 110.3, which may be employed according to the present system and method. Computer 110 may implement or execute, for example, any of the benchmarking application tools 105. The computer 110 typically has a motherboard (not shown) which typically holds and interconnects various microchips 715/720/725, and volatile and non-volatile memory or storage 730/735, which together enable at the hardware level the operations of the computer 110 and also enable the operations of the present system and method 102, 170. Computer 110 may include, for example and without limitation:

A hardware microprocessor 715, also known as a central processing unit (CPU) 715, which provides for overall operational control of the computer 110. This includes but is not limited to receiving data from data files or from connections to other computers 110, receiving data from a target hardware platform 130, and sending data or files to the target hardware platform 130. Microprocessor 715 is also configured to perform the arithmetic and logical operations necessary to implement the present system and method 102, 170.

Persons skilled in the relevant arts will appreciate that the hardware microprocessor 715 is distinct from a target processor 130.1 of a target hardware platform 130, and similarly that memory 720, 730, 735 is also distinct from a memory 130.3 of a target hardware platform 130 or controller 130.

Static memory or firmware 720 may store non-volatile operational code, including but not limited to operating system code, computer code for locally processing and analyzing data, and computer code which may be used specifically to enable the computer 110 to implement the methods described in this document and other methods within the scope and spirit of the appended claims. CPU 715 may employ the code stored in the static memory 720 and/or dynamic memory 730 and/or non-volatile data storage 735 to implement the methods described in this document and other methods within the scope and spirit of the appended claims.

Control circuits 725 may perform a variety of tasks, including data and control exchanges, as well as input/output (I/O) tasks, network connection operations, control of the bus 712, and other tasks generally known in the art of processing systems. Control circuits 725 may also control or interface with non-volatile data storage 735.

Control circuits 725 may also support such functions as external input/output (for example, via USB ports, an Ethernet port, or wireless communications, not illustrated in the figure).

Volatile memory 730, such as dynamic RAM (DRAM), may be used to temporarily store data or program code. Volatile memory 730 may also be used to temporarily store some or all of the code from static memory 720.

Non-volatile storage may take the form of hard disk drives, solid state drives (including flash drives and memory cards), recording on magnetized tape, storage on DVD or similar optical disks, or other forms of non-volatile storage now known or to be developed.

XI. Further Embodiments

Benchmarking Object Code Compilers and Compiler Optimization Settings: In some embodiments of the present system and method, and in some applications of the Benchmark Tools 105, a same target source code may be compiled into multiple object code modules (115.1.1, 115.1.2, . . . 115.1.$n$), with each object code modules being generated by either or both of (i) different object code compilers and/or (ii) a common object code compiler with different optimization settings. The object code modules may then all be executed on a common target hardware platform (130, 130"), and with identical input test vectors (115.2"). The resulting benchmark values 150 will then indicate how the different compilers, and/or different optimization settings, will affect real-world performance for a common source code run on the common hardware platform.

Automated Benchmarking During Code Development: In an embodiment of the present system and method, the benchmarking suite 102 (or some elements of the benchmarking suite, such as the TMEA 105.1 and the BG 105.3) may be integrated into a source code development environment (IDE). In an embodiment, the IDE, employing the present system and method, may generated object code on-the-fly as new code algorithms are developed. The object code may then by analyzed/benchmarked against a target processor to determine, for example, if a new or modified algorithm throws the operational timing beyond a designated threshold.

Single Computer and Distributed Computers: In some embodiments of the present system and method, the stages or steps of generating the benchmark for a particular code module and a particular hardware processor may be performed by a single computer 110, and with the stages performed substantially consecutively in time (that is, with each successive analysis stage beginning substantially upon the completion of an immediately prior analysis stage).

In alternative embodiments, stages of the analysis may be performed by separate computers 110.$n$ of a distributed system, and may be performed with substantial time gaps (for example, minutes, hours, days or longer periods) between the analysis stages.

In some embodiments, some of the application tools 105 of the present system and method may be made available to programmers or design engineers remotely via the Internet 190 (or via a corporate or organizational intranet 190) for time-distributed or spatially-distributed execution of the present system and method. So that for example an instruction mix breakdown (IMB) 120 may be generated by programmers at a first location with a first computer 110.1; a platform timing data (PTD) 135 may be generated by a hardware platform manufacturer at a second location via a second computer 110.2; and a single performance benchmark (PB) 150 may then be generated for the paired IMB 120 and PTD 135 by a third computer 110.3 at a third location (for example, by a performance benchmark service provider such as General Electric). It will be further understand that the present benchmarking system and method 100 may be understood as being implemented as a whole via one or more application tools 105 and/or via one or more computers 110; and also further understood that any one or several application tool(s) 105.$n$, and/or any one or several associated method step(s) 170.$n$, and/or any one or several computer(s) 110.$n$ which may perform aspects or parts of the present system and method may itself be understood as its own system and/or method within the scope of the present disclosure.

Non-Transitory Storage Medium for Instructions: In some embodiments of the present system and method 100, and as part of enabling the present method the system 102 may include, incorporate, or obtain processing instructions for application tool(s) 105 via one or more non-transitory computer-readable medium (also sometimes referred to as "non-transitory computer-readable storage media", "tangible computer-readable storage media", and other similar phrases) which stores one or more software program(s) 105, software application(s) 105, application tools (105), and application instructions which cause—or when executed can cause—a computer 110 of the benchmarking computer system 102 to execute the processes or methods described throughout this document. Such non-transitory computer-readable media may include, for example and without limitation: floppy disk drives, hard disk drives, solid state drives, flash drives, optical computer disks (CDs), digital video disks (DVDs), read only memory (ROM), programmable read-only memory (PROM), field-programmable gate arrays (FPGAs), and holographic memory. In some embodiments of the present system and method, a processor or microcontroller (not shown in the figures) of a computer 110 may have an integrated memory (for example, in the form of ROM, PROM, or FPGAs) (not shown in the figures) which serves as the "non-transitory computer-readable storage media" of the present system and method.

CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What is claimed is:

1. A computer-readable, non-transitory storage medium storing instructions that, when executed by one or more computers of a benchmarking computer system, causes the one or more computers to execute a method for benchmarking, the method comprising:
    obtaining a first instruction mix breakdown (IMB) of a plurality of machine-language instructions of a first object code module, the first IMB indicative of a number of executions of each machine language instruction of the plurality of machine-language instructions;
    obtaining a first platform timing data (PTD) for a first target hardware platform, the first PTD comprising a single instruction execution timing data for each instruction of a plurality of machine-language instructions of the first target hardware platform; and
    calculating based on the first IMB and the first PTD a first performance benchmark (PB) indicative of an expected performance speed of the first object code module when executed on the first target hardware platform;
    wherein the first IMB is generated by:
    loading the first object code module for execution on the first target hardware platform;
    providing as input to the first target hardware platform an input test vector representing a simulated operations environment;
    executing the first object code module on the first target hardware platform;
    generating the first IMB based on the execution of the first object code module with the input test vector;
    wherein the first IMB is reflective of a number of executions of each machine language instruction of the plurality of machine-language instructions when the first object code module is executed on the first target hardware platform in a designated physical or simulated environment;
    wherein the method further comprises:
    obtaining a second platform timing data (PTD) for a second target hardware platform, the second PTD comprising a real-time execution timing data for each instruction of a plurality of machine-language instructions of the second target hardware platform, wherein the first target hardware platform is different from the second target hardware platform; and
    calculating based on the first IMB and the second PTD, a second PB indicative of an expected performance speed of the first object code module when executed on the second target hardware platform;
    comparing the first PB and the second PB;
    wherein the method further comprises generating the first PTD for the first target hardware platform, wherein the generating comprises:
    executing a selected microcode command of the first target hardware platform a number of times N in succession, wherein the selected microcode command requires at least one parameter, wherein two or more sets of the at least one parameter are determined, the two or more sets of the at least one parameter having different values for the at least one parameter, and the selected microcode command being executed a number of times N using the two or more sets of the at least one parameter;
    identifying a microcode execution time (MET) required to execute the selected microcode command of the first target hardware platform the number of times N in succession; and
    dividing MET by N to determine a single-pass execution time for the selected microcode command.

2. The computer-readable, non-transitory storage medium of claim 1, wherein the step of obtaining the first IMB comprises:
    obtaining a first IMB for which the number of executions of each machine language instruction is determined from an actual execution of the first object code module on the first target hardware platform.

3. The computer-readable, non-transitory storage medium of claim 1, wherein generating the first performance benchmark for the first object code module and the first target hardware platform comprises:
    for each respective machine-language instruction in the first IMB, obtain a respective product by multiplying the real-time execution timing data for the respective instruction times a number of appearances of the respective instruction during the execution of the first object code module, thereby generating a plurality of respective products; and
    generate the first performance benchmark as a sum of the respective products.

4. The computer-readable, non-transitory storage medium of claim 1, wherein the method further comprises:
    obtaining a second instruction mix breakdown (IMB) of a plurality of machine-language instructions of a second object code module, the IMB indicative of a number of executions of each machine language instruction of the plurality of machine-language instructions; and
    calculating based on the second IMB and the first PTD a third performance benchmark (PB) indicative of an expected performance speed of the second object code module when executed on the first target hardware platform;
    comparing the first PB, the second PB, and the third PB.

5. The computer-readable, non-transitory storage medium of claim 4, wherein the method further comprises:
    obtaining a second object code module which is different from the first object code module and which provides a same function as the first object code module, wherein the first performance benchmark and the third performance benchmark are indicative of the relative performance of two different object code modules configured to perform the same function on the first target hardware platform.

6. The computer-readable, non-transitory storage medium of claim 1, wherein the first object code module is utilized in an aircraft system.

7. The computer-readable, non-transitory storage medium of claim 1, wherein the first object code module is utilized in a braking system.

8. A computer-readable, non-transitory storage medium storing instructions that, when executed by one or more computers of a benchmarking computer system, causes the one or more computers to execute a method for benchmarking, the method comprising:
generating a first instruction mix breakdown (IMB) of a plurality of machine-language instructions of a first object code module, wherein:
the first IMB is indicative of a number of respective executions of each respective machine language instruction of the plurality of machine-language instructions on a first target hardware platform; and
wherein the first IMB is determined from an actual execution of the first object code module on at least one of a first target hardware platform and a simulation of the first target hardware platform;
obtaining a first platform timing data (PTD) for the first target hardware platform, the PTD comprising a single instruction execution timing data for each instruction of a plurality of machine-language instructions of the first target hardware platform;
calculating based on the first IMB and the first PTD a first performance benchmark (PB) indicative of an expected performance speed of the first object code module when executed on the first target hardware platform;
obtaining a second platform timing data (PTD) for a second target hardware platform, the second PTD comprising a real-time execution timing data for each instruction of a plurality of machine-language instructions of the second target hardware platform; and
calculating based on the first IMB and the second PTD a second performance benchmark (PB) indicative of an expected performance speed of the first object code module when executed on the second target hardware platform;
comparing the first PB and the second PB;
wherein the method further comprises generating the first PTD for the first target hardware platform, wherein the generating comprises:
executing a selected microcode command of the first target hardware platform a number of times N in succession, wherein the selected microcode command requires at least one parameter, wherein two or more sets of the at least one parameter are determined, the two or more sets of the at least one parameter having different values for the at least one parameter, and the selected microcode command being executed a number of times N using the two or more sets of parameters;
identifying a microcode execution time (MET) required to execute the selected microcode command of the first target hardware platform the number of times N in succession; and
dividing MET by N to determine a single-pass execution time for the selected microcode command.

9. The computer-readable, non-transitory storage medium of claim 8, wherein generating the first IMB further comprises:
providing as input to the first target hardware platform an input test vector representing a physical or simulated operations environment;
executing the first object code module on the first target hardware platform; and
generating the first IMB based on the execution of the object code module with the input test vector.

10. The computer-readable, non-transitory storage medium of claim 8, wherein calculating the performance benchmark for the first object code module when executed on the first target hardware platform comprises:
for each respective machine-language instruction in the first IMB, obtain a respective product by multiplying the real-time execution timing data for the respective instruction times a number of appearances of the respective instruction during the execution of the first object code module, thereby generating a plurality of respective products; and
generate the performance benchmark as a sum of the respective products.

11. The computer-readable, non-transitory storage medium of claim 8, wherein the method further comprises:
generating a second instruction mix breakdown (IMB) of a plurality of machine-language instructions of a second object code module, the IMB indicative of a number of executions of each machine language instruction of the plurality of machine-language instructions;
calculating based on the second IMB and the first PTD a third performance benchmark (PB) indicative of an expected performance speed of the second object code module when executed on the first target hardware platform; and
comparing the first performance benchmark, the second performance benchmark, and the third performance benchmark.

12. The computer-readable, non-transitory storage medium of claim 8, wherein the first object code module is utilized in an aircraft system.

13. A computational system for determining a performance benchmark, the computational system comprising one or more computers, each computer of the one or more computers comprising:
a central processing unit (CPU), a memory, and data input and output resources,
wherein the computational system is configured to execute instructions via the CPU which cause the computational system to:
store in the memory a first instruction mix breakdown (IMB) of a plurality of machine-language instructions of a first object code module, the IMB indicative of a number of executions of each machine language instruction of the plurality as executed by a processor of a first target hardware platform;
store in the memory a first platform timing data (PTD) for the first target hardware platform, the PTD comprising a single instruction execution timing data for each instruction of the plurality of machine-language instructions of the first target hardware platform;
calculate based on the first IMB and the first PTD a first performance benchmark (PB) indicative of an expected performance speed of the first object code module when executed on the first target hardware platform;
store in memory a second platform timing data (PTD) for a second target hardware platform, the second PTD comprising a real-time execution timing data for each instruction of a plurality of machine-language instructions of the second target hardware platform;
calculate based on the first IMB and the second PTD a second performance benchmark (PB) indicative of an expected performance speed of the first object code module when executed on the second target hardware platform; compare the first PB and the second PB;

wherein the computational system is further configured to execute instructions via the CPU which cause the computational system to:

provide as input to a physical or simulated first target hardware platform an input test vector representing an operations environment;

execute the first object code module on the physical or simulated first target hardware platform; and generate the first IMB based on the execution of the first object code module with the input test vector on the physical or simulated first target hardware platform;

generate the first PTD for the first target hardware platform by:
- executing a selected microcode command of the first target hardware platform a number of times N in succession, wherein the selected microcode command requires at least one parameter, wherein two or more sets of the at least one parameter are determined, the two or more sets of the at least one parameter having different values for the at least one parameter, and the selected microcode command being executed a number of times N using the two or more sets of parameters;
- identifying a microcode execution time (MET) required to execute the selected microcode command of the first target hardware platform the number of times N in succession; and
- dividing MET by N to determine a single-pass execution time for the selected microcode command.

14. The computational system of claim 13, wherein the computational system is further configured to execute instructions via the CPU which cause the computational system to:
- calculate for each respective machine-language instruction in the first IMB a respective product by multiplying the real-time execution timing data for the respective instruction times a number of appearances of the respective instruction during the execution of the first object code module, thereby generating a plurality of respective products; and
- calculate the first performance benchmark as a sum of the respective products.

15. The computational system of claim 13, wherein the computational system comprises a plurality of distribute computers, wherein:
- the first IMB may be obtained at a first computer of the plurality of distribute computers; and
- the first performance benchmark may be generated at a second computer of the plurality of distribute computers, whereby the first performance benchmark is generated at the second computer without the second computer obtaining access to a machine level code of the first object code module.

16. The computational system of claim 13, wherein the first object code module is utilized in an aircraft system.

17. The computational system of claim 13, wherein the first object code module is utilized in a braking system.

* * * * *